(12) United States Patent
Mimeault et al.

(10) Patent No.: US 9,378,640 B2
(45) Date of Patent: Jun. 28, 2016

(54) SYSTEM AND METHOD FOR TRAFFIC SIDE DETECTION AND CHARACTERIZATION

(75) Inventors: Yvan Mimeault, Québec (CA); Samuel Gidel, Québec (CA); Michael Poulin, L'Ancienne-Lorette (CA); David Arrouart, Saint-Romuald (CA)

(73) Assignee: LEDDARTECH INC., Québec (CA)

( * ) Notice: Subject to any disclaimer, the term of this patent is extended or adjusted under 35 U.S.C. 154(b) by 126 days.

(21) Appl. No.: 14/126,012

(22) PCT Filed: Jun. 15, 2012

(86) PCT No.: PCT/IB2012/053045
§ 371 (c)(1),
(2), (4) Date: Dec. 13, 2013

(87) PCT Pub. No.: WO2012/172526
PCT Pub. Date: Dec. 20, 2012

(65) Prior Publication Data
US 2014/0232566 A1    Aug. 21, 2014

Related U.S. Application Data

(60) Provisional application No. 61/498,083, filed on Jun. 17, 2011.

(51) Int. Cl.
*G08G 1/01* (2006.01)
*G08G 1/048* (2006.01)
(Continued)

(52) U.S. Cl.
CPC .............. *G08G 1/048* (2013.01); *G01S 7/4802* (2013.01); *G01S 7/4808* (2013.01); *G01S 7/4865* (2013.01);
(Continued)

(58) Field of Classification Search
CPC ..... G01S 17/10; G01S 17/023; G01S 17/026; G01S 17/58; G01S 17/88; G01S 17/89; G01S 17/4865; G01S 17/4808; G01S 17/4802; G01S 7/003; G01S 7/484; G01S 7/487; G01S 7/4802; G01S 7/4808; G01S 7/4861; G01S 7/4865; G08G 1/04; G08G 1/048; G08G 1/052; G08G 1/056

See application file for complete search history.

(56) References Cited

U.S. PATENT DOCUMENTS 3,680,085 A    7/1972   Del Signore
3,967,111 A    6/1976   Brown
(Continued)

FOREIGN PATENT DOCUMENTS

CA    2633377    6/2007
CA    2710212    7/2009
(Continued)

OTHER PUBLICATIONS

Shimoni et al., "Detection of vehicles in shadow areas", Workshop on Hyperspectral Image and Signal Processing: Evolution in Remote Sensing (WHISPERS), 2011 3rd, Jun. 6-9, 2011, pp. 1-4, IEEE, Lisbon.
(Continued)

*Primary Examiner* — John A Tweel, Jr.
*Assistant Examiner* — Adnan Aziz
(74) *Attorney, Agent, or Firm* — Robert Plotkin, P.C.; Robert Plotkin

(57) ABSTRACT

A method for detecting a vehicle comprising: providing a multi-channel scannerless full-waveform lidar system operating in pulsed Time-Of-Flight operation oriented towards a surface of the roadway to cover the detection zone; providing at least one initialization parameter; emitting pulses at an emission frequency; receiving reflections of the pulses from the detection zone; and acquiring and digitalizing a series of individual complete traces at each channel of system; identifying at least one detection in at least one of the traces; obtaining a height and an intensity for the detection; determining a nature of the detection to be one of an environmental particle detection, a candidate object detection and a roadway surface detection; if the nature of the detection is the candidate object detection, detecting a presence of a vehicle in the detection zone.

32 Claims, 24 Drawing Sheets

(51) Int. Cl.

| | | |
|---|---|---|
| *G01S 17/02* | (2006.01) | |
| *G01S 17/88* | (2006.01) | |
| *G01S 7/48* | (2006.01) | |
| *G06K 9/00* | (2006.01) | |
| *G08G 1/04* | (2006.01) | |
| *G08G 1/052* | (2006.01) | |
| *G08G 1/056* | (2006.01) | |
| *G01S 17/10* | (2006.01) | |
| *G01S 17/89* | (2006.01) | |
| *G01S 7/486* | (2006.01) | |

(52) U.S. Cl.
 CPC ............. *G01S 17/023* (2013.01); *G01S 17/026* (2013.01); *G01S 17/10* (2013.01); *G01S 17/88* (2013.01); *G01S 17/89* (2013.01); *G06K 9/00785* (2013.01); *G08G 1/04* (2013.01); *G08G 1/052* (2013.01); *G08G 1/056* (2013.01)

(56) References Cited

U.S. PATENT DOCUMENTS

| | | | |
|---|---|---|---|
| 4,533,242 A | | 8/1985 | McLauchlan et al. |
| 4,634,272 A | | 1/1987 | Endo |
| 4,717,862 A | | 1/1988 | Anderson |
| 4,733,961 A | | 3/1988 | Mooney |
| 4,808,997 A | | 2/1989 | Barkley et al. |
| 4,891,624 A | | 1/1990 | Ishikawa et al. |
| 4,928,232 A | | 5/1990 | Gentile |
| 5,102,218 A | | 4/1992 | Min et al. |
| 5,134,393 A | | 7/1992 | Henson |
| 5,179,286 A | | 1/1993 | Akasu |
| 5,270,780 A | | 12/1993 | Moran et al. |
| 5,317,311 A | | 5/1994 | Martell et al. |
| 5,357,331 A | | 10/1994 | Flockencier |
| 5,381,155 A | | 1/1995 | Gerber |
| 5,389,921 A | | 2/1995 | Whitton |
| 5,546,188 A | * | 8/1996 | Wangler ............... A01M 7/0089 356/398 |
| 5,621,518 A | | 4/1997 | Beller |
| 5,627,511 A | * | 5/1997 | Takagi .................... G01S 7/489 340/435 |
| 5,629,704 A | | 5/1997 | Throngnumchai et al. |
| 5,633,629 A | | 5/1997 | Hochstein |
| 5,633,801 A | | 5/1997 | Bottman |
| 5,663,720 A | * | 9/1997 | Weissman ................ G08G 1/01 340/905 |
| 5,714,754 A | | 2/1998 | Nicholas |
| 5,760,686 A | | 6/1998 | Toman |
| 5,760,887 A | | 6/1998 | Fink et al. |
| 5,764,163 A | | 6/1998 | Weldman et al. |
| 5,777,564 A | | 7/1998 | Jones |
| 5,793,491 A | | 8/1998 | Wangler |
| 5,805,468 A | | 9/1998 | Blöhbaum |
| 5,812,249 A | | 9/1998 | Johnson et al. |
| 5,828,320 A | | 10/1998 | Buck |
| 5,836,583 A | | 11/1998 | Towers |
| 5,838,116 A | | 11/1998 | Katyl et al. |
| 5,889,477 A | | 3/1999 | Fasterath |
| 5,896,190 A | | 4/1999 | Wangler et al. |
| 5,942,753 A | | 8/1999 | Dell |
| 5,953,110 A | | 9/1999 | Burns |
| 5,963,127 A | | 10/1999 | Lang et al. |
| 5,995,900 A | | 11/1999 | Hsiao et al. |
| 6,044,336 A | | 3/2000 | Marmarelis et al. |
| 6,094,159 A | | 7/2000 | Osterfeld et al. |
| 6,100,539 A | | 8/2000 | Blümcke et al. |
| 6,104,314 A | | 8/2000 | Jiang |
| 6,107,942 A | | 8/2000 | Yoo et al. |
| 6,115,113 A | | 9/2000 | Flockencier |
| 6,142,702 A | | 11/2000 | Simmons |
| 6,147,624 A | | 11/2000 | Clapper |
| 6,166,645 A | | 12/2000 | Blaney |
| 6,259,515 B1 | | 7/2001 | Benz et al. |
| 6,259,862 B1 | | 7/2001 | Marino et al. |
| 6,266,609 B1 | | 7/2001 | Fastenrath |
| 6,281,632 B1 | | 8/2001 | Stam et al. |
| 6,285,297 B1 | | 9/2001 | Ball |
| 6,301,003 B1 | * | 10/2001 | Shirai ................... G01S 7/4816 180/169 |
| 6,304,321 B1 | | 10/2001 | Wangler |
| 6,340,935 B1 | | 1/2002 | Hall |
| 6,363,326 B1 | | 3/2002 | Scully |
| 6,377,167 B1 | | 4/2002 | Juds et al. |
| 6,388,565 B1 | | 5/2002 | Bernhard et al. |
| 6,404,506 B1 | | 6/2002 | Cheng et al. |
| 6,411,221 B2 | | 6/2002 | Horber |
| 6,417,783 B1 | | 7/2002 | Gabler et al. |
| 6,426,708 B1 | | 7/2002 | Trajkovic et al. |
| 6,502,011 B2 | | 12/2002 | Haag |
| 6,502,053 B1 | | 12/2002 | Hardin et al. |
| 6,516,286 B1 | | 2/2003 | Aebischer et al. |
| 6,548,967 B1 | | 4/2003 | Dowling et al. |
| 6,556,916 B2 | | 4/2003 | Waite et al. |
| 6,559,776 B2 | | 5/2003 | Katz |
| 6,580,385 B1 | * | 6/2003 | Winner et al. .................. 342/70 |
| 6,642,854 B2 | | 11/2003 | McMaster |
| 6,650,250 B2 | | 11/2003 | Muraki |
| 6,665,621 B2 | | 12/2003 | Drinkard et al. |
| 6,674,394 B1 | | 1/2004 | Zoratti |
| 6,753,766 B2 | | 6/2004 | Patchell |
| 6,753,950 B2 | | 6/2004 | Morcom |
| 6,765,495 B1 | | 7/2004 | Dunning et al. |
| 6,771,185 B1 | | 8/2004 | Yoo et al. |
| 6,794,831 B2 | | 9/2004 | Leeb et al. |
| 6,821,003 B2 | | 11/2004 | Baker et al. |
| 6,825,778 B2 | | 11/2004 | Bergan et al. |
| 6,831,576 B2 | | 12/2004 | Geiger et al. |
| 6,836,317 B1 | | 12/2004 | Perger |
| 6,842,231 B2 | | 1/2005 | Nourrcier et al. |
| 6,850,156 B2 | | 2/2005 | Bloomfield et al. |
| 6,885,311 B2 | | 4/2005 | Howard |
| 6,885,312 B1 | | 4/2005 | Kirkpatrick |
| 6,917,307 B2 | | 7/2005 | Li |
| 6,927,700 B1 | | 8/2005 | Quinn |
| 6,946,974 B1 | | 9/2005 | Racunas, Jr. |
| 7,026,954 B2 | | 4/2006 | Slemmer et al. |
| 7,049,945 B2 | | 5/2006 | Breed et al. |
| 7,081,832 B2 | | 7/2006 | Nelson et al. |
| 7,106,214 B2 | | 9/2006 | Jesadanont et al. |
| 7,116,246 B2 | | 10/2006 | Winter et al. |
| 7,119,674 B2 | | 10/2006 | Sefton |
| 7,119,715 B2 | | 10/2006 | Orita |
| 7,123,166 B1 | | 10/2006 | Haynes et al. |
| 7,135,991 B2 | | 11/2006 | Slemmer et al. |
| 7,148,813 B2 | | 12/2006 | Bauer |
| 7,209,221 B2 | | 4/2007 | Breed et al. |
| 7,221,271 B2 | | 5/2007 | Reime |
| 7,221,288 B2 | | 5/2007 | Fitzgibbon et al. |
| 7,236,102 B2 | | 6/2007 | Shimotani |
| 7,250,605 B2 | | 7/2007 | Zhevelev et al. |
| 7,253,747 B2 | | 8/2007 | Noguchi |
| 7,317,384 B2 | | 1/2008 | Lefranc |
| 7,319,777 B2 | | 1/2008 | Morcom |
| 7,321,317 B2 | | 1/2008 | Nath et al. |
| 7,350,945 B2 | | 4/2008 | Albou et al. |
| 7,352,972 B2 | | 4/2008 | Franklin |
| 7,359,782 B2 | | 4/2008 | Breed et al. |
| 7,378,947 B2 | | 5/2008 | Daura Luna et al. |
| 7,405,676 B2 | | 7/2008 | Janssen |
| 7,417,718 B2 | | 8/2008 | Wada et al. |
| 7,426,450 B2 | | 9/2008 | Arnold et al. |
| 7,486,204 B2 | | 2/2009 | Quintos |
| 7,492,281 B2 | | 2/2009 | Lynam et al. |
| 7,504,932 B2 | | 3/2009 | Bartels |
| 7,554,652 B1 | | 6/2009 | Babin et al. |
| 7,573,400 B2 | | 8/2009 | Arnold et al. |
| 7,616,293 B2 | | 11/2009 | Sirota et al. |
| 7,633,433 B2 | | 12/2009 | Behrens et al. |
| 7,635,854 B1 | | 12/2009 | Babin |
| 7,640,122 B2 | | 12/2009 | Levesque et al. |
| 7,652,245 B2 | | 1/2010 | Crickmore et al. |
| 7,688,222 B2 | | 3/2010 | Peddie et al. |
| 7,725,348 B1 | | 5/2010 | Allen |

(56) References Cited

U.S. PATENT DOCUMENTS

| | | |
|---|---|---|
| 7,734,500 B1 | 6/2010 | Allen |
| 7,760,111 B2 | 7/2010 | Lynam et al. |
| 7,764,193 B2 | 7/2010 | Chen |
| 7,796,081 B2 | 9/2010 | Breed |
| 7,808,401 B1 | 10/2010 | Schwartz et al. |
| 7,852,462 B2 | 12/2010 | Breed et al. |
| 7,855,376 B2 | 12/2010 | Cantin et al. |
| 7,859,432 B2 | 12/2010 | Kim et al. |
| 7,872,572 B2 | 1/2011 | Harrington et al. |
| 7,884,740 B2* | 2/2011 | Tzuang ............... G08G 1/015 340/933 |
| 7,889,097 B1 | 2/2011 | Arnold et al. |
| 7,889,098 B1 | 2/2011 | Arnold et al. |
| 7,895,007 B2 | 2/2011 | Levesque et al. |
| 7,898,433 B2 | 3/2011 | Roberts |
| 7,917,320 B2 | 3/2011 | Levesque et al. |
| 7,933,690 B2 | 4/2011 | Kushida et al. |
| 7,952,491 B2 | 5/2011 | Schwartz et al. |
| 7,957,900 B2 | 6/2011 | Chowdhary et al. |
| 8,242,476 B2 | 8/2012 | Mimeault et al. |
| 8,331,621 B1 | 12/2012 | Allen |
| 8,436,748 B2 | 5/2013 | Mimeault et al. |
| 8,593,519 B2 | 11/2013 | Tauchi |
| 8,600,656 B2 | 12/2013 | Mimeault et al. |
| 8,629,977 B2* | 1/2014 | Phillips ............... G01S 7/4813 335/78 |
| 8,761,447 B2 | 6/2014 | Maxik |
| 8,823,951 B2 | 9/2014 | Mimeault |
| 8,924,140 B2 | 12/2014 | Sakamoto |
| 9,235,988 B2 | 1/2016 | Mimeault |
| 2002/0005778 A1 | 1/2002 | Breed et al. |
| 2002/0033884 A1 | 3/2002 | Schurr |
| 2002/0117340 A1 | 8/2002 | Stettner |
| 2003/0154017 A1 | 8/2003 | Ellis |
| 2003/0189500 A1 | 10/2003 | Lim |
| 2004/0035620 A1 | 2/2004 | McKeefery |
| 2004/0051859 A1 | 3/2004 | Flockencier |
| 2004/0083035 A1 | 4/2004 | Ellis |
| 2004/0118624 A1 | 6/2004 | Beuhler et al. |
| 2004/0130702 A1* | 7/2004 | Jupp ............... G06K 9/0063 356/5.01 |
| 2004/0135992 A1 | 7/2004 | Munro |
| 2004/0254728 A1* | 12/2004 | Poropat ............... 701/301 |
| 2005/0036130 A1* | 2/2005 | Arita ............... G01S 17/936 356/4.01 |
| 2005/0046597 A1 | 3/2005 | Hutchison et al. |
| 2005/0078297 A1* | 4/2005 | Doemens et al. ............... 356/5.04 |
| 2005/0117364 A1 | 6/2005 | Rennick et al. |
| 2005/0187701 A1 | 8/2005 | Baney |
| 2005/0231384 A1 | 10/2005 | Shimotani |
| 2005/0232469 A1 | 10/2005 | Schofield et al. |
| 2005/0269481 A1 | 12/2005 | David et al. |
| 2005/0270175 A1 | 12/2005 | Peddie et al. |
| 2005/0285738 A1 | 12/2005 | Seas et al. |
| 2006/0033641 A1 | 2/2006 | Jaupitre |
| 2006/0066472 A1 | 3/2006 | Janssen |
| 2006/0145824 A1 | 7/2006 | Frenzel et al. |
| 2006/0147089 A1 | 7/2006 | Han et al. |
| 2006/0149472 A1 | 7/2006 | Han et al. |
| 2006/0180670 A1 | 8/2006 | Acosta et al. |
| 2006/0203505 A1 | 9/2006 | Griesinger et al. |
| 2006/0221228 A1 | 10/2006 | Kikuchi |
| 2007/0018106 A1 | 1/2007 | Zhevelev et al. |
| 2007/0061192 A1 | 3/2007 | Chew |
| 2007/0091294 A1 | 4/2007 | Hipp |
| 2007/0096943 A1 | 5/2007 | Arnold et al. |
| 2007/0181786 A1* | 8/2007 | Doemens et al. ............... 250/221 |
| 2007/0205918 A1 | 9/2007 | Riesco Prieto et al. |
| 2007/0222639 A1 | 9/2007 | Giles et al. |
| 2007/0228262 A1 | 10/2007 | Cantin et al. |
| 2007/0255525 A1 | 11/2007 | Lee et al. |
| 2008/0006762 A1 | 1/2008 | Fadell et al. |
| 2008/0166023 A1 | 7/2008 | Wang |
| 2008/0172171 A1 | 7/2008 | Kowalski |
| 2008/0186470 A1 | 8/2008 | Hipp |
| 2008/0245952 A1* | 10/2008 | Troxell ............... G03B 15/05 250/208.1 |
| 2008/0278366 A1 | 11/2008 | Behrens |
| 2008/0309914 A1 | 12/2008 | Cantin et al. |
| 2009/0027185 A1 | 1/2009 | Daura Luna |
| 2009/0102699 A1 | 4/2009 | Behrens et al. |
| 2009/0243822 A1 | 10/2009 | Hinninger et al. |
| 2009/0251680 A1 | 10/2009 | Farsaie |
| 2009/0267784 A1 | 10/2009 | Braghiroli et al. |
| 2009/0299631 A1* | 12/2009 | Hawes et al. ............... 701/300 |
| 2009/0323741 A1 | 12/2009 | Deladurantaye et al. |
| 2010/0066527 A1 | 3/2010 | Liou |
| 2010/0117812 A1 | 5/2010 | Laubinger et al. |
| 2010/0141765 A1 | 6/2010 | Capello et al. |
| 2010/0191418 A1 | 7/2010 | Mimeault et al. |
| 2010/0194595 A1 | 8/2010 | Mimeault et al. |
| 2010/0214554 A1 | 8/2010 | Audier et al. |
| 2010/0277713 A1 | 11/2010 | Mimeault |
| 2010/0309024 A1 | 12/2010 | Mimeault |
| 2011/0006188 A1 | 1/2011 | Lin |
| 2011/0025843 A1 | 2/2011 | Oggier et al. |
| 2011/0026007 A1* | 2/2011 | Gammenthaler ............... 356/28 |
| 2011/0115409 A1 | 5/2011 | Schwartz et al. |
| 2011/0115645 A1 | 5/2011 | Hall et al. |
| 2011/0134249 A1 | 6/2011 | Wood et al. |
| 2011/0205521 A1 | 8/2011 | Mimeault et al. |
| 2011/0235028 A1 | 9/2011 | Rohrseitz |
| 2012/0268602 A1* | 10/2012 | Hirai ............... G06K 9/00798 348/148 |
| 2012/0287417 A1 | 11/2012 | Mimeault |
| 2012/0307065 A1 | 12/2012 | Mimeault et al. |
| 2013/0083316 A1* | 4/2013 | Mimeault ............... A47B 53/02 356/73 |

FOREIGN PATENT DOCUMENTS

| | | |
|---|---|---|
| CN | 2857132 | 1/2007 |
| DE | 29617413 | 11/1996 |
| DE | 19823135 | 11/1999 |
| DE | 19921449 | 1/2001 |
| DE | 69710579 | 8/2002 |
| DE | 10247290 | 4/2004 |
| DE | 19604338 | 7/2004 |
| DE | 102004035856 | 3/2005 |
| DE | 20200501816 | 11/2005 |
| DE | 102006025020 | 11/2007 |
| DE | 202008007078 | 10/2008 |
| DE | 102007038973 | 2/2009 |
| DE | 102009013841 | 9/2009 |
| DE | 102004016025 | 5/2010 |
| DE | 102008043880 | 5/2010 |
| DE | 102010012811 A1 | 9/2011 |
| EP | 0188393 A1 | 7/1986 |
| EP | 0318260 | 5/1989 |
| EP | 0476562 | 3/1992 |
| EP | 0259445 | 8/1993 |
| EP | 0494815 | 12/1996 |
| EP | 0798684 | 10/1997 |
| EP | 0838695 | 4/1998 |
| EP | 0612049 | 9/1998 |
| EP | 0912970 | 4/2000 |
| EP | 0779990 | 3/2003 |
| EP | 0935764 | 3/2003 |
| EP | 1296302 | 3/2003 |
| EP | 0789342 | 6/2003 |
| EP | 1334869 A2 | 8/2003 |
| EP | 0784302 | 9/2003 |
| EP | 1034522 | 1/2004 |
| EP | 0866434 | 6/2004 |
| EP | 0988624 | 7/2004 |
| EP | 0834424 | 11/2004 |
| EP | 1220181 | 8/2005 |
| EP | 1521226 | 6/2006 |
| EP | 1049064 | 9/2006 |
| EP | 0904552 | 3/2007 |
| EP | 1052143 | 7/2007 |
| EP | 1542194 | 5/2009 |
| EP | 1048961 | 7/2009 |
| EP | 2106968 | 10/2009 |

(56) References Cited

FOREIGN PATENT DOCUMENTS

| | | |
|---|---|---|
| EP | 1224632 | 12/2009 |
| EP | 2136550 | 12/2009 |
| EP | 1435036 | 1/2010 |
| EP | 1611458 | 4/2010 |
| EP | 1997090 | 9/2010 |
| EP | 1859990 | 4/2011 |
| EP | 2306426 A1 | 4/2011 |
| EP | 2393295 A1 | 12/2011 |
| FR | 2690519 | 10/1993 |
| FR | 2743150 | 7/1997 |
| FR | 2743151 | 7/1997 |
| FR | 2749670 | 12/1997 |
| FR | 2910408 | 6/2008 |
| GB | 2264411 | 8/1993 |
| GB | 2311265 | 9/1997 |
| GB | 2354898 | 7/2003 |
| GB | 2369737 | 2/2005 |
| GB | 2399968 | 2/2005 |
| GB | 2431498 | 4/2007 |
| GB | 2445767 | 7/2008 |
| JP | 57206872 | 12/1982 |
| JP | 5824876 | 2/1983 |
| JP | 2059608 | 2/1990 |
| JP | 04145390 | 5/1992 |
| JP | 04145391 | 5/1992 |
| JP | H04172285 A | 6/1992 |
| JP | 5119147 | 5/1993 |
| JP | 6331745 | 12/1994 |
| JP | H07280940 | 10/1995 |
| JP | 09178786 | 7/1997 |
| JP | 2000198385 | 7/2000 |
| JP | 2004102889 | 4/2004 |
| JP | 20051425 A | 1/2005 |
| JP | 2005170184 | 6/2005 |
| JP | 2006021720 | 1/2006 |
| JP | 2006507180 | 3/2006 |
| JP | 2006172210 | 6/2006 |
| JP | 2006258598 | 9/2006 |
| JP | 2006258598 A | 9/2006 |
| JP | 2006521536 | 9/2006 |
| JP | 2007121116 | 5/2007 |
| WO | 8705138 | 8/1987 |
| WO | 9203808 | 3/1992 |
| WO | 9634252 | 10/1996 |
| WO | 9904378 | 1/1999 |
| WO | 0139153 | 5/2001 |
| WO | 0185491 | 11/2001 |
| WO | 0215334 | 2/2002 |
| WO | 03000520 | 1/2003 |
| WO | 03007269 | 1/2003 |
| WO | 2004010402 | 1/2004 |
| WO | 2004027451 | 4/2004 |
| WO | 2004036244 | 4/2004 |
| WO | 2004039631 A1 | 5/2004 |
| WO | 2004100103 | 11/2004 |
| WO | 2005008271 | 1/2005 |
| WO | 2005072358 A2 | 8/2005 |
| WO | 2006031220 | 3/2006 |
| WO | 2006044758 | 4/2006 |
| WO | 2006082502 | 8/2006 |
| WO | 2006092659 | 9/2006 |
| WO | 2007005942 | 1/2007 |
| WO | 2007071032 | 6/2007 |
| WO | 2007096814 | 8/2007 |
| WO | 2008037049 | 4/2008 |
| WO | 2008121648 | 10/2008 |
| WO | 2008154736 | 12/2008 |
| WO | 2008154737 | 12/2008 |
| WO | 2009013739 | 1/2009 |
| WO | 2009079789 | 7/2009 |
| WO | 2009087536 | 7/2009 |
| WO | 2009104955 | 8/2009 |
| WO | 2009117197 | 9/2009 |
| WO | 2010033024 | 3/2010 |
| WO | 2010057697 | 5/2010 |
| WO | 2010069002 | 6/2010 |
| WO | 2010122284 | 10/2010 |
| WO | 2010144349 | 12/2010 |
| WO | 2011015817 | 2/2011 |
| WO | 2011025563 | 3/2011 |
| WO | 2011055259 | 5/2011 |
| WO | 2011077400 | 6/2011 |
| WO | 2012153309 | 11/2012 |
| WO | 2012172526 | 12/2012 |
| WO | 2013128427 | 9/2013 |

OTHER PUBLICATIONS

United States Department of Transportation, Federal Highway Administration, Sensor Technology—Chapter 2, Traffic Detector Handbook: Third Edition—vol. 1, FHWA-HRT-06-108, available at http://www.tfhrc.gov/its/pubs/06108/02a.htm on Sep. 16, 2009.

The Vehicule Detector Clearinghouse, "A Summary of Vehicle Detection and Surveillance Technologies used in Intelligent Transportaion Systems", Fall 2000, Southwest Technology Development Insitute (SWTDI) at New Mexico State University (NMSU), sponsored in cooperation with the U.S. Department of Transportation FHWA, available at http://www.fhwa.dot.gov/ohim/tvtw/vdstits.

U.S. Department of Transportation Federal Highway Administration, "Detailed Monitoring Protocol 4.0 Monitoring Methods", Department of Air Quality, Air Toxic MSAT, available at http://www.fhwa.dot.gov/environment/air_quality/air_toxics/research_and_analysis/near_road_study/protocol/protocol04.cfm, Updated on Jul. 6, 2011.

United States Department of Transportation, Research and Innovative Technology Administration, 5.3. Infrared Detectors, available at http://ntl.bts.gov/DOCS/96100/ch05/body_ch05_03.html on Sep. 16, 2009.

Tayfun Kon, Thesis, "Collision Warning and Avoidance System for Crest Vertical Curves", Virginia Tech, May 4, 1998, Appendix 82, pp. 51-92, published on Digital Library and Archives, University Libraries of Virginia Tech, VA.

Lawrence A. Klein, Vehicle Detector Technologies for Traffic Management Applications, Part 1, Colorado Department of Transportation, Intelligent Transportation Systems (ITS), 1997, available at http://www.cotrip.org/its/ITS%20Guidelines%20Web%20New%20Format%202-05/Web%20Solutions%20Packages/ITS%20Solution%20Packages%20-%20Web%20Copy/Vehicle%20Detectors/Klein%20Part%201%20Vehicle%20Detector%20Technologies.doc on Sep. 16, 2009.

Hussain, Tarik Mustafa, City University of New-York, Infrared Vehicle Sensor for Traffic Control, Thesis (PHD) City University of New York, Dissertation Abstracts International, vol. 55-07, Section A, p. 2176, 1994, available at http://adsabs.harvard.edu//abs/1994PhDT 85H on Sep. 16, 2009.

Dimitri Loukakos, Active Laser Infrared Detectors, Intelligent Transportation Systems, Traffic Surveillance, California Center for Innovative Transportation at the University of California, Dec. 20, 2001, available at http://www.calccit.org/itsdecision/serv_and_tech/Traffic_Surveillance/road-based/roadside/other_roadside_rep.html on Sep. 16, 2009.

Geneq Inc., Passive Infrared Detector for Traffic Data Acquisition, Model IR 250, Department of Meteorology, available at http://www.geneq.com/catalog/en/ir250.html on Sep. 16, 2009.

Akindinov et al., "Detection of Light Pulses Using an Avalanche-Photodiode Array with a Metal-Resistor-Semiconductor Structure", Instruments and Experimental Techniques, Nov. 2004, vol. 48, No. 3 205, pp. 355-363, Russia.

Braun et al., "Nanosecond transient electroluminescence from polymer lightemitting diodes", Applied Physics Letters Dec. 1992, vol. 61, No. 26, pp. 3092-3094, California.

\* cited by examiner

SYSTEM AND METHOD FOR TRAFFIC SIDE DETECTION AND CHARACTERIZATION

CROSS-REFERENCE TO RELATED APPLICATIONS

This application is a national phase entry of PCT Application No. PCT/IB2012/053045, entitled "SYSTEM AND METHOD FOR TRAFFIC SIDE DETECTION AND CHARACTERIZATION" filed on Jun. 15, 2012; which in turn claims priority under 35 USC §119(e) of U.S. provisional patent application 61/498,083 filed Jun. 17, 2011, the specifications of which are hereby incorporated by reference herein.

TECHNICAL FIELD

The present invention relates to a system and method for traffic detection and more particularly to an optical system that detects the presence of vehicles on a roadway regardless of environmental particles present in the field of view using an active three-dimensional sensor based on the time-of-flight ranging principle.

BACKGROUND OF THE ART

Information from sensors is the base point in the optimization of traffic management and law enforcement. Using sensors allows gathering statistical data about different parameters related to traffic monitoring and detecting traffic infractions like speed limit violations. Examples of interesting parameters to track are detecting the presence of a vehicle in a detection zone, counting the number of vehicles on the roadway, namely the volume on the roadway, determining the lane position, classifying the vehicle, counting the number of axles, determining the direction of the vehicle, estimating the occupancy and determining the speed.

In the case of speed enforcement, especially for average speed enforcement, determining the exact position of the front and back of a vehicle is useful data. Average speed measurement systems measure the average speed of a vehicle over a predetermined distance and use detectors to determine the time at the entry and the exit points of one section of a vehicle. The entry and exit points are usually hundreds of meters or even kilometers apart. Then, they synchronize the automatic plate number recognition and vehicle identification systems and use the known distance between those points to calculate the average speed of a vehicle. In the case of an average speed exceeding the speed limit, a fine can be issued by law enforcement authorities.

Speed enforcement can require classifying vehicles to determine the right speed limit for a vehicle type. Some countries set different minimum and/or maximum speed limits for heavy trucks and buses. Commercial vehicles can also have other constraints such as truck lane restrictions specifying on which lane a certain type of vehicle is allowed to travel, to requiring classification functionality from the detection system.

Advanced Transportation Management Systems (ATMS) rely on accurate traffic data from different kinds of detectors divided in two categories: intrusive and non-intrusive. One type of intrusive detectors involves inductive loop detectors that are still a common technology for detecting vehicles even if that technology has some disadvantages such as lengthy disruption to the traffic flow during installation and maintenance, relatively high cost, high failure rate and inflexibility. Other detectors, like cameras with video processing, radar-based sensors, laser-based sensors, passive infrared and ultrasound sensors have been introduced for traffic monitoring but also have their limitations and the market is still searching for alternatives.

Video processing sensors have well know drawbacks such as the lack of performance in terms of false alarms during night operation or the difficulty to perform during bad weather conditions affecting visibility such as during an episode of fog. Environmental particles are known to be difficult to manage.

Radar technology is known to perform well in bad weather conditions but has some limitations in terms of lateral resolution. Accurate occupancy measurement can be limited when occupancy is high. In some cases, for measuring the speed of a vehicle, radar traffic detectors located on the side of the road use an average length for the vehicles which causes errors in the vehicle speed estimate.

Thus, there is a need for a method and system for robust and accurate detection for multipurpose traffic management applications.

SUMMARY

According to a broad aspect of the present invention, there is provided a method for detecting a vehicle located in a detection zone of a roadway having at least one lane, the detection zone on the roadway at least partly covering a width of the lane, the method comprising: providing a multi-channel scannerless full-waveform lidar system operating in to pulsed Time-Of-Flight operation, an optical window of the full-waveform lidar system being oriented towards a surface of the roadway in order for the full-waveform lidar system to cover the detection zone; providing at least one initialization parameter for the full-waveform lidar system; using the full-waveform lidar system, emitting pulses at an emission frequency; receiving reflections of the pulses from the detection zone; and acquiring and digitalizing a series of individual complete traces at each channel of the multi-channel system; identifying at least one detection in at least one of the individual complete traces; obtaining a height and an intensity for the detection using the individual complete trace; determining a nature of the detection to be one of an environmental particle detection, a candidate object detection and a roadway surface detection using at least one of the individual complete traces, the height, the intensity and the at least one initialization parameter; if the nature of the detection is the candidate object detection, detecting a presence of a vehicle in the detection zone.

In one embodiment, the method further comprises tracking an evolution of the detection in a time-spaced individual complete trace, the time-spaced individual complete trace being acquired after the individual complete trace, wherein the determining the nature includes comparing at least one of the height and the intensity in the time-spaced individual complete trace and the individual complete trace.

In one embodiment, the method further comprises obtaining a distance for the detection using the individual complete trace and the initialization parameter, wherein the determining the nature includes using at least one of the individual complete traces, the height, the intensity, the distance and the at least one initialization parameter.

In one embodiment, determining the nature includes determining a probability that the nature of the detection is the environment particle if the tracking the evolution determines that the height decreases by more than a height threshold and the distance increases by more than a distance threshold; if the probability is higher than a probability threshold, determining the nature to be the environmental particle.

In one embodiment, determining the nature to be the environmental particle includes determining a presence of at least one of fog, water, rain, liquid, dust, dirt, vapor, snow, smoke, gas, smog, pollution, black ice and hail.

In one embodiment, the method further comprises identifying a presence of a retroreflector on the vehicle using the individual complete traces and the initialization is parameters, by comparing an intensity of the detections with an intensity threshold and identifying detections having an intensity higher than the intensity threshold to be caused by a retroreflector on the vehicle.

In one embodiment, the method further comprises tracking an evolution of the detection in a time-spaced individual complete trace, the time-spaced individual complete trace being acquired at a time delay after the individual complete trace, wherein the identifying the presence of the retroreflector is carried out for the individual complete trace and the time-spaced individual complete trace, determining a distance of the retroreflector using the individual complete trace and the time-spaced individual complete trace and estimating a speed of the vehicle based on the initialization parameter, the distance and the time delay.

In one embodiment, the multi-channel scannerless full-waveform lidar system includes a light emitting diode (LED) light source adapted to emit the pulses.

In one embodiment, digitalizing the series of individual complete traces at each channel of the multi-channel system includes digitalizing the series at a high frame rate, the high frame rate being greater than Hz.

In one embodiment, the method further comprises providing an image sensing module adapted and positioned to acquire an image covering at least the detection zone; synchronizing acquisition of the image with the acquiring and digitalizing of the full-waveform lidar system; acquiring the image with the image sensing module.

In one embodiment, the method further comprises recognizing a pattern in the image using the initialization parameter.

In one embodiment, the pattern is a circle, the pattern in the image corresponding to a wheel of the vehicle.

In one embodiment, the method further comprises determining a position of the pattern in the image, taking a second image after an elapsed time delay, recognizing the pattern in the second image and determining a second position of the pattern, determining a displacement of the pattern between the image and the second image.

In one embodiment, the method further comprises obtaining a distance for the pattern using the individual complete traces and the initialization parameter, and estimating a speed of the vehicle using the displacement, the distance for the pattern in the image and the pattern in the second image, the elapsed time delay and the initialization parameter.

In one embodiment, a longitudinal dimension of the detection zone is perpendicular to the roadway.

In one embodiment, the method further comprises identifying a section of the vehicle detected to be present in the detection zone using the individual complete trace, the section being one of a front, a side, a top and a rear of the vehicle, the identifying the section including comparing a height of the detection with a height threshold and comparing an intensity of the detection with an intensity threshold.

In one embodiment, the method further comprises determining a position of the section of the vehicle in the detection zone using at least one of the individual complete traces and the at least one initialization parameter.

In one embodiment, the method further comprises determining a current lane of the roadway in which the vehicle is present using the initialization parameter and the individual complete trace.

In one embodiment, obtaining the height and the intensity for the detection using the individual complete trace further comprises converting the detections in Cartesian coordinates.

In one embodiment, the method further comprises generating a profile of one of a side and a top of the vehicle using a plurality of the individual complete traces.

In one embodiment, the method further comprises determining a length of the vehicle using a plurality of the individual complete traces and the speed of the vehicle, the time delay and the initialization parameter.

In one embodiment, the method further comprises providing a second one of the multi-channel scannerless full-waveform lidar system, an optical window of the second full-waveform lidar system being oriented towards a surface of the roadway in order for the second system to cover a second detection zone, the second detection zone at least partly overlapping the detection zone, operation of the full-waveform lidar system and the second full-waveform lidar system being synchronized.

In one embodiment, the method further comprises providing a second one of the multi-channel scannerless full-waveform lidar system, an optical window of the second full-waveform lidar system being oriented towards a surface of the roadway in order for the second system to cover a second detection zone, operation of the full-waveform lidar system and the second full-waveform lidar system being synchronized, wherein the second system is provided at a lateral offset on the roadway with respect to the full-waveform lidar system; determining a speed of the vehicle using a delay between detection of the vehicle by the full-waveform lidar system and the second full-waveform lidar system and the initialization parameter.

In one embodiment, the method further comprises associating a type to the vehicle to classify the vehicle using the height.

In one embodiment, the method further comprises associating a type to the vehicle to classify the vehicle using at least one of the height and the length.

In one embodiment, the method further comprises associating a type to the vehicle to classify the vehicle using at least one of the height, the length and the pattern.

In one embodiment, the method further comprises associating a type to the vehicle to classify the vehicle using at least one of the height, the length, the pattern and the profile.

In one embodiment, the method further comprises generating a detection signal upon the detecting the presence.

In one embodiment, the detection signal controls at least one of a hardware trigger and a software trigger.

In one embodiment, the detection signal includes information about the detection.

In one embodiment, the method further comprises generating a recall signal to invalidate at least one of the hardware trigger and the software trigger.

In one embodiment, the method further comprises storing information about the detection.

In one embodiment, the method further comprises generating and storing statistical information.

In one embodiment, the method further comprises determining a direction of displacement of the vehicle using the displacement and identifying a wrong-way vehicle using the direction of displacement and the initialization parameter.

According to another broad aspect of the present invention, there is provided a method for detecting a vehicle comprising:

providing a multi-channel scannerless full-waveform lidar system operating in pulsed Time-Of-Flight operation oriented towards a surface of the roadway to cover the detection zone; providing at least one initialization parameter; emitting pulses at an emission frequency; receiving reflections of the pulses from the detection zone; and acquiring and digitalizing a series of individual complete traces at each channel of system; identifying at least one detection in at least one of the traces; obtaining a height and an intensity for the detection; determining a nature of the detection to be one of an environmental particle detection, a candidate object detection and a roadway surface detection; if the nature of the detection is the candidate object detection, detecting a presence of a vehicle in the detection zone.

According to another broad aspect of the present invention, there is provided a method for detecting a vehicle located in a detection zone of a roadway. The method comprises providing a multiple-field-of-view scannerless LED full-waveform lidar system operating in pulsed Time-Of-Flight operation at a detection height and at a lateral distance from a side of the roadway; the method including emitting at a high repetition rate, receiving, acquiring and digitalizing a series of individual complete traces at each channel, in parallel; detecting and identifying, at least one of, for a vehicle, a presence, a position of the front, rear or middle, a profile of a side, a height, a number of axles, a length, a direction of movement, a displacement speed, a distance, and/or a number of detections of vehicles over time, a percentage of time during which a vehicle is detected, a position of a surface of the roadway or a visibility.

According to still another broad aspect of the present invention, there is provided a method for detecting a vehicle which includes providing a multi-channel scannerless full-waveform lidar system operating in pulsed Time-Of-Flight operation at a lateral distance from a side of the roadway, providing an initialization parameter, using the full-waveform lidar system, emitting pulses; receiving reflections from the detection zone; and acquiring and digitalizing a series of individual complete traces at each channel of the multi-channel system; identifying at least one detection in an individual complete trace; obtaining a height and an intensity for the detection using the individual complete trace; determining a nature of the detection to be one of an environmental particle detection, a candidate object detection and a roadway surface detection; if the nature of the detection is the candidate object detection, detecting a presence of a vehicle in the detection zone.

Throughout this specification, the term "vehicle" is intended to include any movable means of transportation for cargo, humans and animals, not necessarily restricted to ground transportation, including wheeled and unwheeled vehicles, such as, for example, a truck, a bus, a boat, a subway car, a train wagon, an aerial tramway car, a ski lift, a plane, a car, a motorcycle, a tricycle, a bicycle, a Segway™, a carriage, a wheelbarrow, a stroller, etc.

Throughout this specification, the term "environmental particle" is intended to include any particle detectable in the air or on the ground and which can be caused by an environmental, chemical or natural phenomenon or by human intervention. It includes fog, water, rain, liquid, dust, dirt, vapor, snow, smoke, gas, smog, pollution, black ice, hail, etc.

Throughout this specification, the term "object" is intended to include a moving object and a stationary object. For example, it can be a vehicle, an environmental particle, a person, a passenger, an animal, a gas, a liquid, a particle such as dust, a pavement, a wall, a post, a sidewalk, a ground surface, a tree, etc.

BRIEF DESCRIPTION OF THE DRAWINGS

The accompanying drawings, which are included to provide a better understanding of the main aspects of the system and method and are incorporated in and constitute a part of this specification, illustrate different embodiments and together with the description serve to explain the principles of the system and method. The accompanying drawings are not intended to be drawn to scale. In the drawings:

FIGS. 10A and 10B show the detection of the front, FIGS. 10C and 10D the detection of the windshield, FIGS. 10E and 10F the detection of the middle and FIGS. 10G and 10H the detection of the back of the vehicle;

FIGS. 19A and 19B form an example sequence for the speed estimation based on the lateral displacement of the vehicle, wherein FIG. 19A shows a photograph taken by the image sensor when the front of a vehicle is detected by the 3D sensor with overlay, and FIG. 19B is a photograph showing the lateral displacement of a pattern recognized by the system;

FIGS. 20A and 20B are photographs illustrating the profile information of a vehicle with a traffic detection system installed on the side of the road, wherein FIG. 20A illustrates the 3D information and FIG. 20B shows an image of the detected vehicle taken by the Image Sensing Module; and FIGS. 21A and 21B are photographs illustrating the profile information obtained with a traffic detection system installed on a gantry, preferably under a transversal beam, above the road, wherein FIG. 21A illustrates the 3D information and FIG. 21B shows an image of the detected vehicle taken by the Image Sensing Module.

DETAILED DESCRIPTION

1. Use, Set-Up, Basic Principles and Features

Reference will now be made in detail to examples. The system and method may however, be embodied in many different forms and should not be construed as limited to the example embodiments set forth in the following description.

Figure 1:
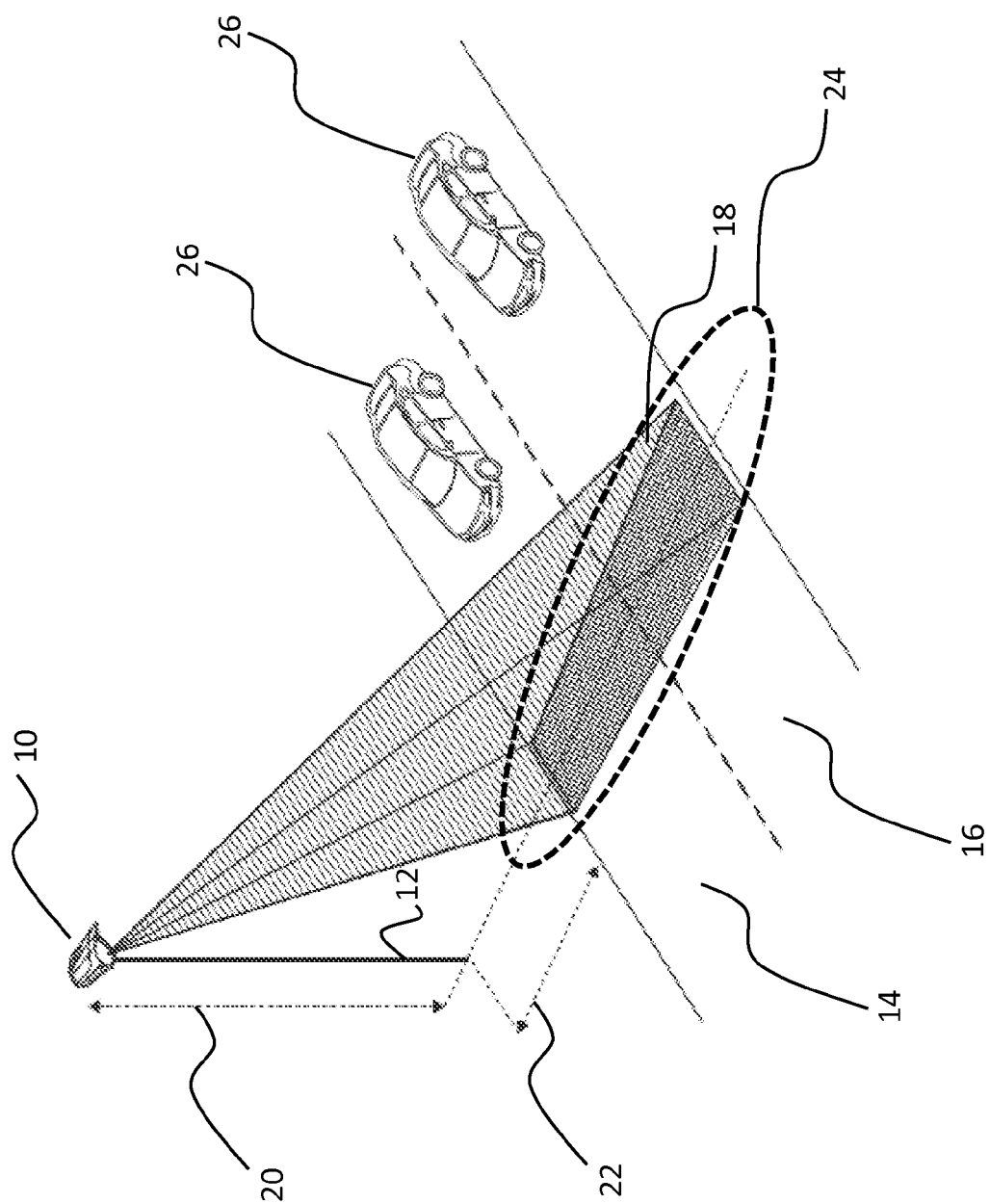
FIG. 1 shows an example installation of the traffic detection system on the side of a roadway.

An example mounting configuration of the traffic detection system 10 can be appreciated with reference to FIG. 1, which depicts a schematic view of a roadway with two to lanes being shown. The traffic detection system 10 is shown in FIG. 1 mounted on a pole 12. The system casing can have a perpendicular orientation to the traffic direction. Pole 12 can be a new dedicated road infrastructure for the sensor installation, an existing road infrastructure or other types of new or existing infrastructures such as streetlights, gantries or buildings. This exemplary roadway comprises two adjacent traffic lanes 14 and 16 for vehicles. In this example, the traffic lanes 14 and 16 are for incoming traffic. The traffic detection system is intended to detect any type of objects that may be present within a predetermined 3D detection zone 18. The 3D detection zone 18 has a longitudinal dimension which is perpendicular to the traffic direction.

The mounting height 20 of the traffic detection system 10 is for example between 1 m and 8 m with a lateral distance 22 from the nearest traffic lane 14 for example between 1 m and 6 m. The system can also be installed over the roadway, for example under the transversal beam of a gantry (not shown). The 3D detection zone would still have a longitudinal dimension which is perpendicular to the traffic direction under the gantry. In FIG. 1, two vehicles 26 travelling on traffic lanes 14 and 16 enter the 3D detection zone 18 in the same direction. When those vehicles reach the 3D detection zone 18, the traffic detection system 10 is used for detecting and profiling the vehicles coming into the zone. In the example embodiment, the traffic detection system 10 is based on an InfraRed (IR) Light-Emitting-Diode (LED) illumination source determining a Field-of-Illumination (FOI) zone 24 covering the 3D detection zone 18 with a multiple Field-of-View (FOV) detector.

Figure 2:
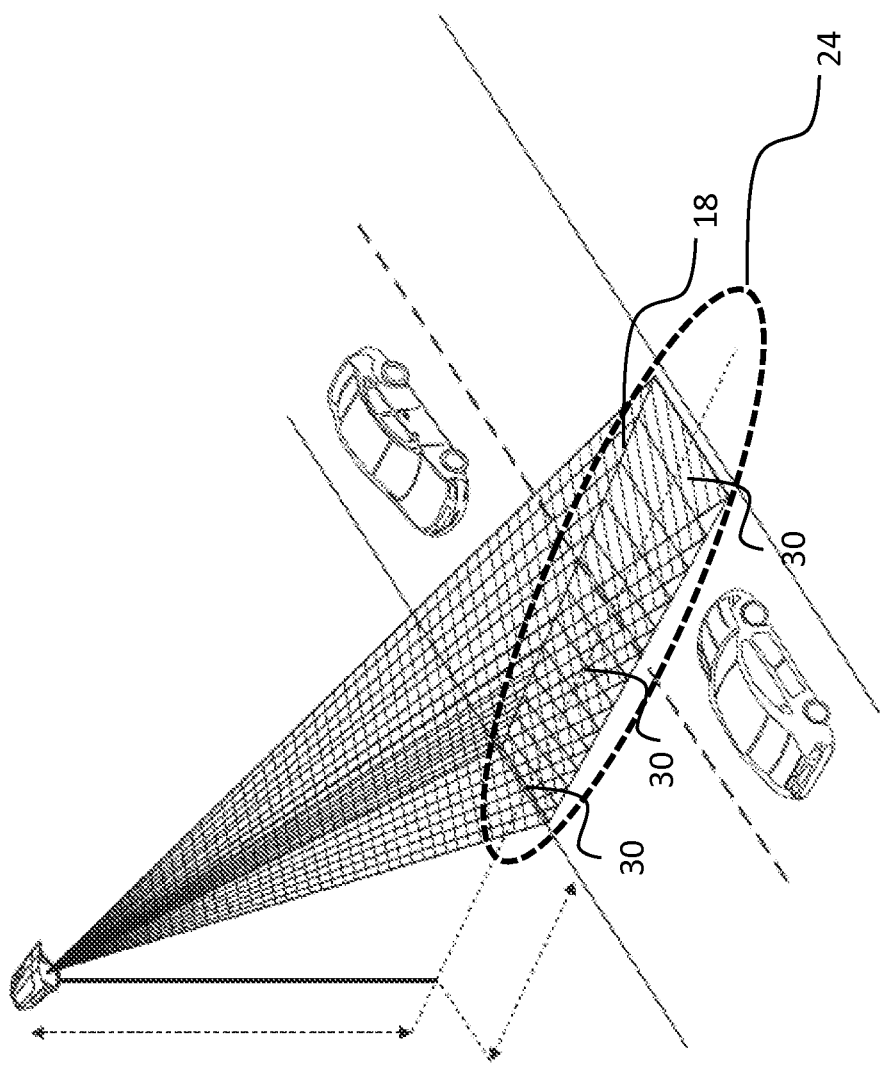
FIG. 2 shows another example installation of the traffic detection system on the side of a roadway with the detection zone consisting in a set of contiguous rectangular areas.

In another example embodiment of the system, shown in FIG. 2, the overall detection zone consists in a set of contiguous rectangular areas 30, which can have a similarly shaped FOV and which extend across the monitored lanes. The projection on a vertical plane, namely the footprint, of the 3D detection zone of the traffic detection system defines the overall 3D detection zone. The 3D detection zone 18 is divided into several rectangular areas and each rectangular area 30, referred to herein as "a sub-detection zone", is monitored by a separate optical detection channel implemented in the traffic detection system. For example, the outline of the 3D detection zone 18 can be separated into sixteen adjacent detection zones. However, it should be appreciated that the dimensions, aspect ratios, exact locations of the detection zones as well as their number are examples. FIG. 2 also shows 2 lanes with vehicles in opposite direction.

The system allows optically monitoring a region of a roadway by using a plurality of independent detection zones. The system then enables traffic detection for each individual lane while providing substantial flexibility in configuring the system. For example, FIG. 1 readily suggests that the width of each lane of the roadway can be covered by more than a single detection channel of the traffic detection system. The outputs from a number of adjacent detection channels can be combined together to form a composite detection channel associated to a given lane. This scheme mapping may help in promoting a higher detection probability for the system and with redundancy.

The traffic detection system 10 is referred to as being "active" due to the fact that it radiates light having predetermined characteristics over the overall detection zone. The active nature of the system enables its operation around the clock and in numerous daytime/nighttime lighting conditions, while making it relatively immune to disturbances coming from parasitic light of various origins. The outline of the portion of the roadway that is lighted by the traffic detection system is outlined in FIG. 1 by the ellipse sketched in dashed line. The two-dimensional angular extent of the radiated light defines the FOI 24 of the system. It can be noted that the perimeter of the FOI should be adapted to the size of the overall detection zone to promote an efficient usage of the radiated light, thus meaning that, similarly to the overall detection zone, the FOI usually displays a sizable asymmetry.

Figure 3:
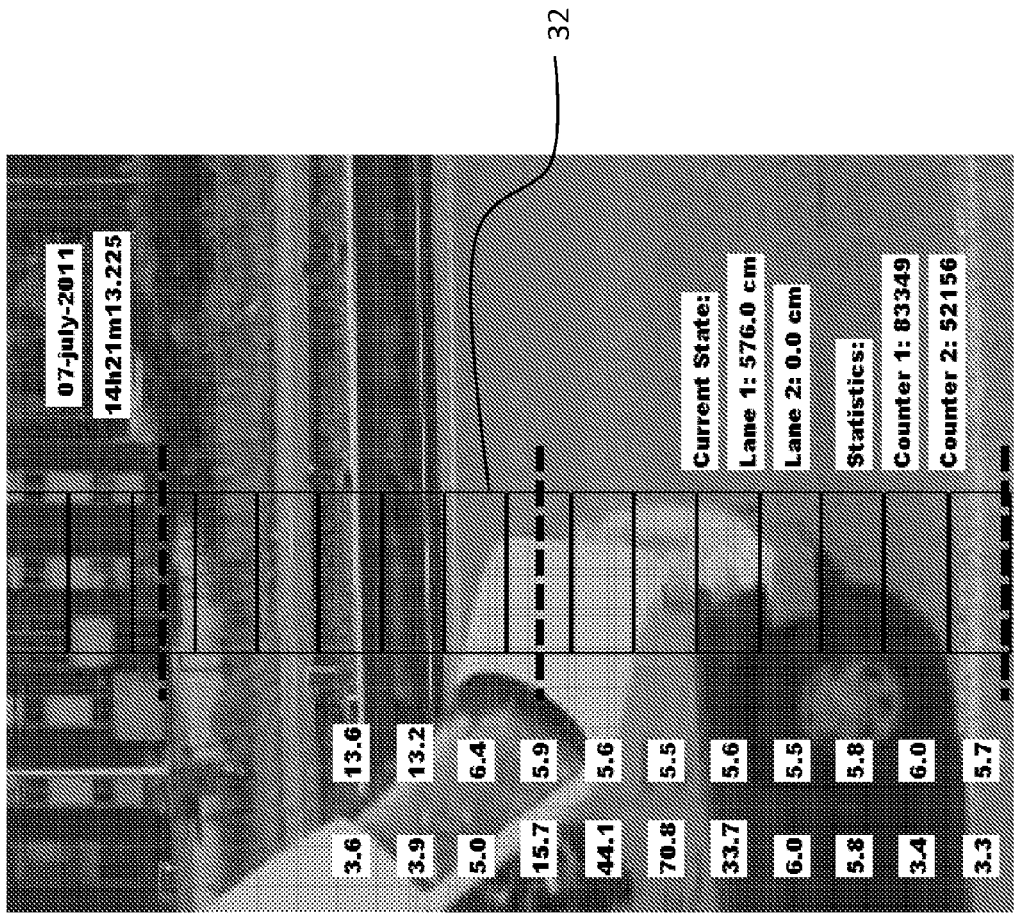
FIG. 3 is a photograph which shows an example of a snapshot taken by the image sensor with the overlay of the 3D sensor displaying a vehicle in the detected zone with distance measurements.

As it will be explained in further details below, an image sensing device can be integrated in the traffic detection system that forwards images to a remote operator to help him in performing a fine adjustment of the location of the overall detection zone of the system. By way of example, FIG. 3 shows an image of the corresponding field of view ($FOV_{VM}$) of the image sensing device. This example image of a roadway captured by an image sensing device is overlaid with overlay 32 to show the perimeters of a set of 16 contiguous detection zones. In this example, the vehicle present in the first lane would be detected by several adjacent channels at a respective detected distance between 5.5 m and 6.4 m. Note that the overall detection zone is wide enough to cover more than two lanes.

In addition to the detection of vehicles present within a two-dimensional detection zone, the active nature of the traffic detection system provides an optical ranging capability that enables measurement of the instantaneous distances of the detected vehicles from the system. This optical ranging capability is implemented via the emission of light in the form of very brief pulses along with the recordal of the time it takes to the pulses to travel from the system to the vehicle and then to return to the system. Those skilled in the art will readily recognize that the optical ranging is performed via the so-called Time-Of-Flight (TOF) principle, of widespread use in optical rangefinder devices. However, most optical rangefinders rely on analog peak detection of the light pulse signal reflected from a remote object followed by its comparison with a predetermined amplitude threshold level. On the contrary, the traffic detection system numerically processes the signal waveform acquired for a certain period of time after the emission of a light pulse. The traffic detection system can then be categorized as a full-waveform LIDAR (LIght Detection And Ranging) instrument.

FIG. 1 also shows that the extent of the 3D detection zone across any given lane of a roadway is determined by factors such as the mounting height of the system, the spreading or divergence angle of the light cone emitted from the system, the downwards pointing angle of the system, and the distance that separates it from the line painted on the pavement separating each lane and indicating the lane width. As a result, the length of the detection zones across the lanes depends on factors related to the optical design of the system, the design of the traffic detection system as well as on the way it is mounted on the pole.

Because light travels at a rapid but nevertheless finite speed, the emission of a single pulse of light by the traffic detection system will result in the subsequent reception of a brief optical signal echo starting at the time $t=2L_{MIN}/c$ and having a duration $\Delta t=2(L_{MAX}-L_{MIN})/c$. In these expressions, c is the speed of light, namely $3\times10^8$ m/s. For an example installation, the distance between the sensor and the objects to be detected is in the range of 2 m to 20 m. An optical signal echo from an object would start to be recorded after a time delay $t\approx13$ ns following the emission of the light pulse, and it would end up at a time $t+\Delta t\approx135$ ns. Any vehicle present in a lane monitored by the traffic detection system would reflect the incoming light in a manner that differs substantially from the reflection of the light on a road pavement. The difference between the measurement of the distance of the road pavement and the measurement of the distance of any vehicle detected by the sensor during its presence in the detection zone is enough to produce a distinctive signal echo and a distinctive distance measurement on which the reliable detection of the vehicle by the system is based.

2—Description of the Traffic Detection System

Overview

Figure 4:
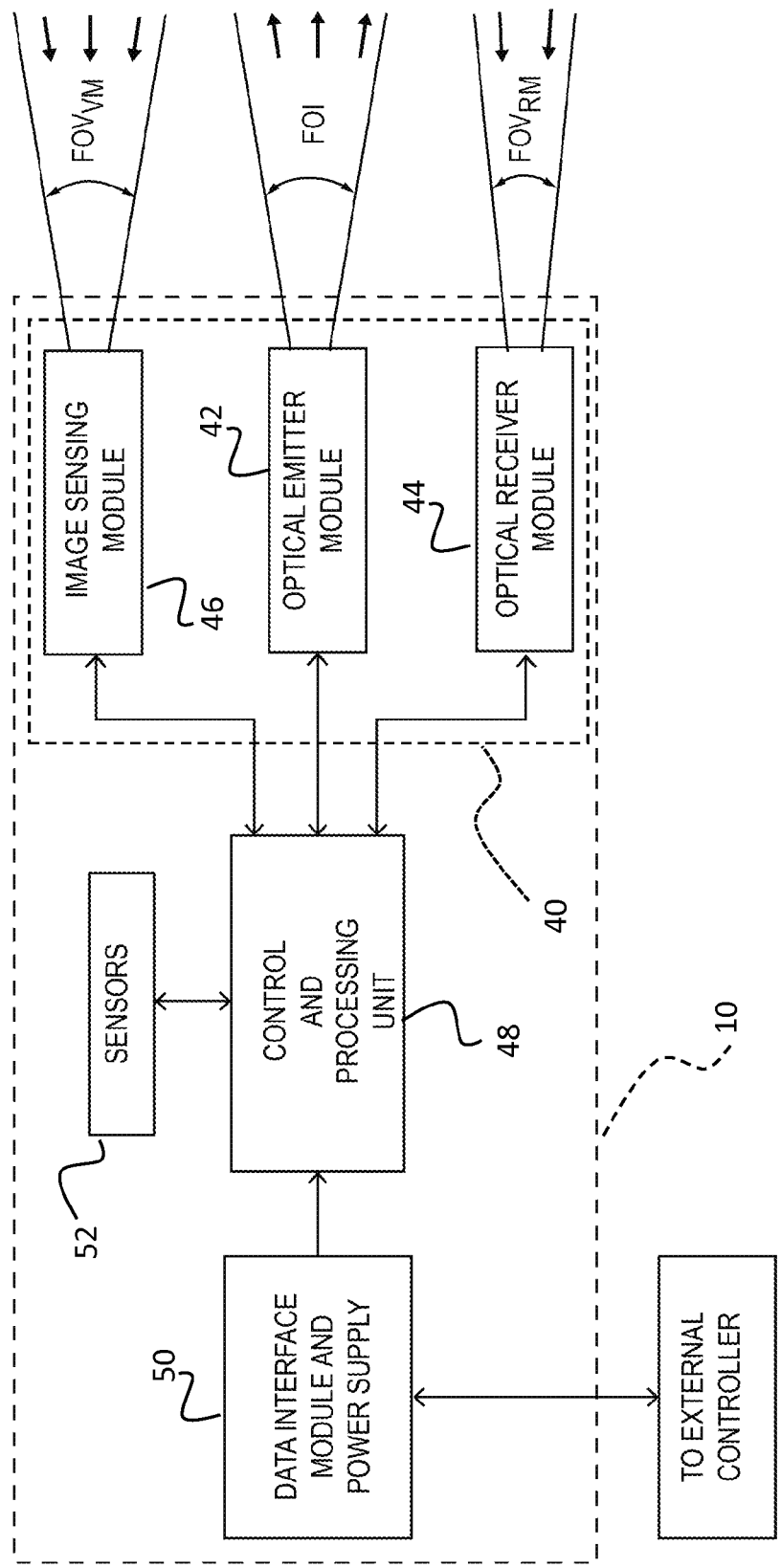
FIG. 4 is a functional bloc diagram of an example traffic detection system showing its main components and their interconnections.

The functionalities of the various components integrated in an example traffic detection system 10 can be better understood by referring to the functional block diagram shown in FIG. 4. Six modules mounted inside an enclosure form part of the example traffic detection system 10, three of these modules being collectively grouped within an optical unit 40 in FIG. 4. The optical unit 40 includes an Optical Emitter Module (OEM) 42 which emits short pulses of light within a predetermined FOI. In one example embodiment, the optical emitter includes infrared Light Emitting Diodes (LEDs). Other optical sources such as Lasers can also be used. A part of the light diffusively reflected by the vehicles, objects and the road pavement is directed towards the collecting aperture of an Optical Receiver Module (ORM) 44 for its optical detection and subsequent conversion into voltage waveforms. To be detected, an object should lie within the FOV of the ORM, which is defined by its optics as well as by the dimensions of its optically sensitive device. The third module of the optical unit consists of an Image Sensing Module (ISM) 46 which provides images of the portion of the roadway area that encompasses the FOI of the OEM and the FOV of the ORM. The three modules exchange data and receive commands and signals from the Control and Processing Unit 48. The Control and Processing Unit 48 can have various embodiments and can include an acquisition sub-system for digitization of the analog signal waveforms, a pre-processing and synchronization control, a memory, and a processing unit. The pre-processing and synchronization control can be provided by digital logic, for example by a Field-Programmable Gated Array (FPGA) board. The processing unit can be a Digital Signal Processing (DSP) unit, a microcontroller or an embarked Personal Computer (PC) board as will be readily understood. Some functions of the Control and Processing Unit can also be integrated in the optical unit.

The Control and Processing Unit 48 has numerous functions in the operation of the traffic detection system, one of these being the calibration of the system. This calibration process can be done by connecting a remote computer to the Control and Processing Unit and communicate together by the operation of a data interface module and power supply 50. During normal operation of the traffic detection system, data interface 50 also allows the Control and Processing Unit 48 to send data about the vehicles detected at the monitored intersection to an external controller for traffic management. The detection data outputted from the Control and Processing Unit 48 results from the numerical real-time processing of the voltage waveforms forwarded by the ORM and also includes data from the ISM. Several types of interface can be used to communicate with the external controller: Ethernet, RS-485, wireless link, etc. The data information can also be stored in memory and recovered later. The data interface 50 can also send electrical trigger signals to synchronize events like the detection of a front or a rear of a vehicle to other devices like an external camera or other traffic management controllers.

The data interface module 50 can also be useful to transmit images to an external system or network to allow a remote operator to monitor the traffic at the intersection. Video compression, for example H.264, can be done by a processor to limit the bandwidth required for the video transmission.

FIG. 4 shows a functional block labeled Sensors 52 for measuring different parameters like the internal temperature in the system enclosure monitored with a temperature sensor, the current orientation of the system using an inclinometer/compass assembly. Such information may be useful for timely detection of the line of sight that gets misaligned. The sensor suite may also include an accelerometer for monitoring in real-time the vibration level to which the system is submitted as well as a Global Positioning System (GPS) unit for real-time tracking of the location of the system or for having access to a real-time clock. The system can be powered via a connection to an electrical power line, which also supplies the traffic light assemblies installed at the intersection. A power supply provides the properly filtered DC voltages required to operate the various modules and units while their protection against any voltage surge or transient is provided by a surge protection circuitry. The power supply and the data link can be integrated in one connector using an interface such as Power over Ethernet (PoE).

Figure 5:
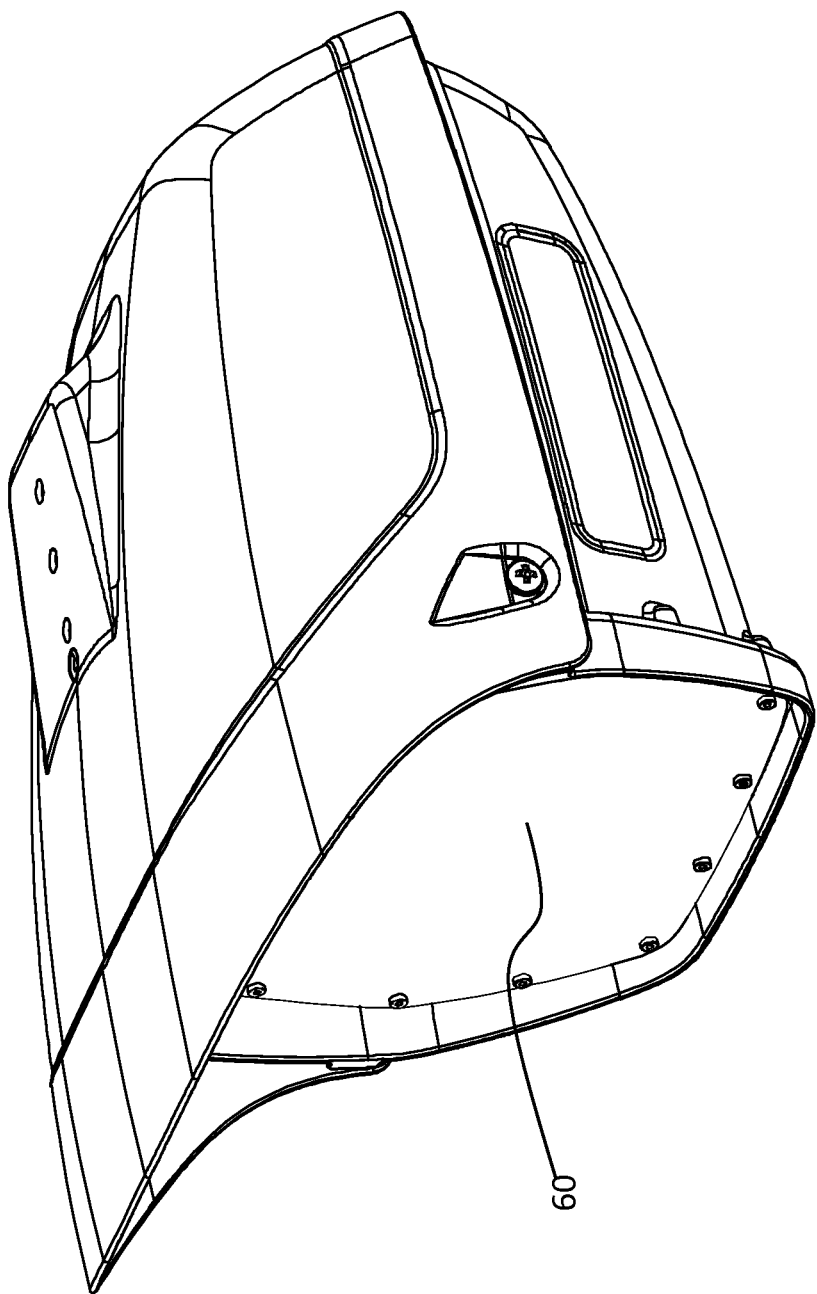
FIG. 5 shows an example of a casing for the traffic detector.

FIG. 5 shows an example casing with a window 60 for the traffic detection system and can house a more or less complete suite of monitoring instruments, each of them forwarding its output data signals to the Control and Processing Unit for further processing or relay. In other configurations of the casing, lateral sections can be integrated to protect the window from the road dust.

3—Methods for Numerical Processing of the Captured Signal Waveforms

The system implements a processing of the signal waveforms generated by the plurality of optical detection channels. The primary objective of the waveform processing is to detect, within a prescribed minimum detection probability, the presence of vehicles in a lane that is mapped to a number of adjacent detection channels. Because of the usual optical reflection characteristics of the bodies of vehicles and of various constraints that limit the performances of the modules implemented in a traffic detection system, the optical return signals captured by the ORM are often plagued with an intense noise contribution that washes out faint signal echoes indicative of the presence of a vehicle. As a consequence, some of the first steps of the waveform processing are intended to enhance the Signal-to-Noise Ratio (SNR) of the useful signal echoes. Such filtering steps may start by numerically correlating the raw waveforms with a replica of a strong, clean signal echo that was previously captured or artificially generated. The waveforms processed this way get a smoother shape since a significant part of the high-frequency noise initially present in the raw waveforms has been eliminated.

In a second step of the processing, the SNR of the useful signal echoes present in the waveforms can be further enhanced by averaging a number of successively-acquired waveforms. The better SNRs obtained by standard signal averaging or accumulation are possible provided that the noise contributions present in the successive waveforms are independent from each other and fully uncorrelated. When this condition is satisfied, which is often the case after proper elimination of the fixed pattern noise contribution, it can be shown that the SNR of the waveforms can be increased by a factor of $(N)^{1/2}$, where N is the number of averaged waveforms. Averaging 100 successive waveforms can then result in an order of magnitude SNR enhancement.

Another condition that can limit the number of waveforms to be averaged is the need for a stationary process which generates the useful signal echoes. In other words, the properties, such as the peak amplitude, shape, time/distance location, of the useful features present in the waveforms should remain ideally unchanged during the time period required to capture a complete set of waveforms that will be averaged. When attempting to detect vehicles that move rapidly, the signal echoes can drift more or less appreciably from waveform to waveform. Although this situation occurs frequently during operation of the traffic detection system, its detrimental impacts can be alleviated by designing the traffic detection system so that it radiates light pulses at a high repetition rate, for example in the tens or hundreds of kHz range. Such high repetition rates will enable the capture of a very large number of waveforms during a time interval sufficiently short enough to keep stationary the optical echoes associated to a moving vehicle. Detection information on each channel can then be upgraded, for example between few tens to few hundreds time per second. The high frame rate could be greater than 100 Hz for example. For example, with a traffic detection system using a frame rate at 200 Hz, a car at 250 km/h would have moved forward by 35 cm between each frame.

Figure 6:
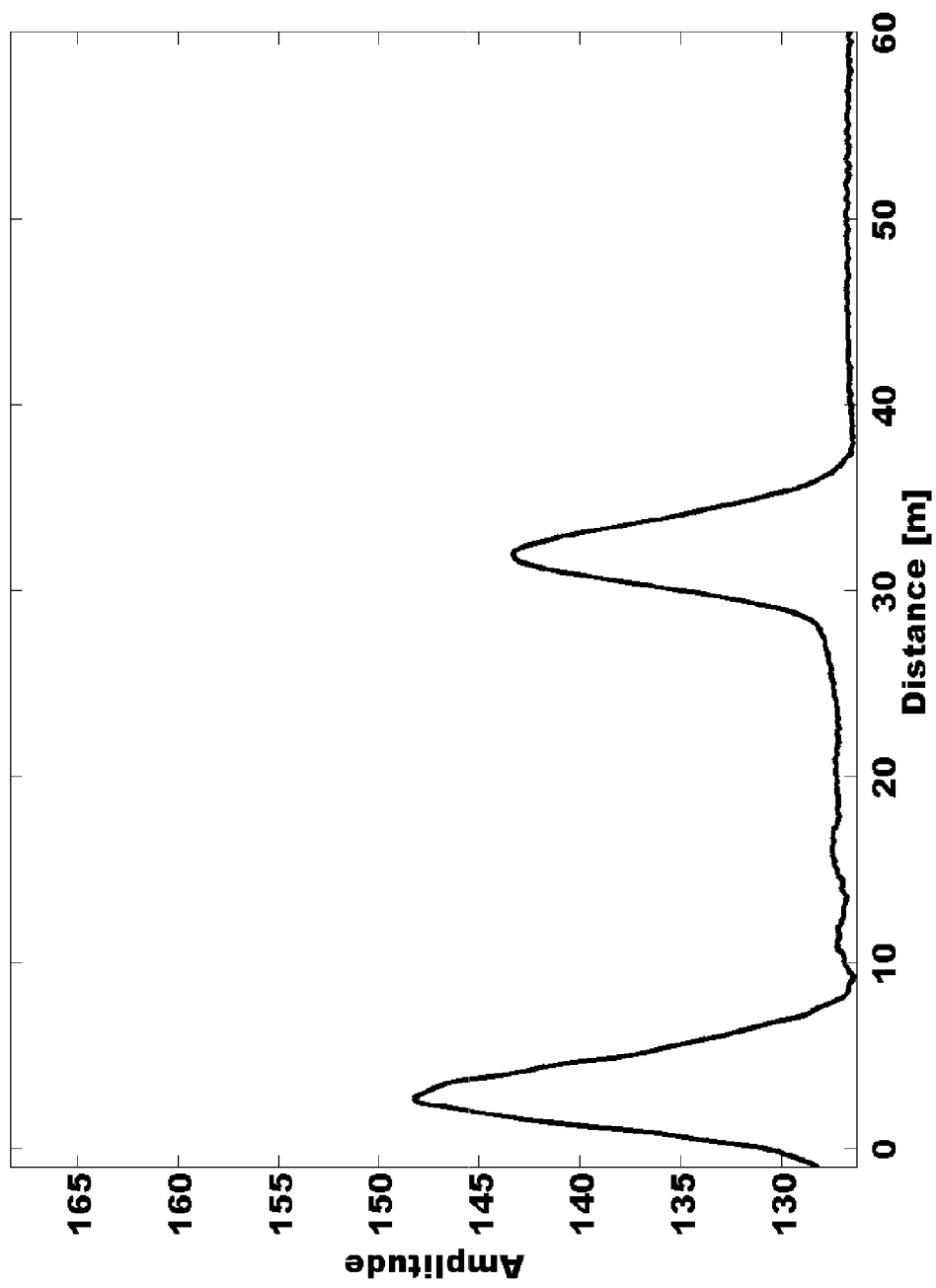
FIG. 6 shows an example signal waveform acquired by the traffic detection system.

FIG. 6 shows an example signal waveform acquired by one channel of the traffic detection system 10. The first pulse visible on the left-hand side of the waveform comes from the reflection of a radiated light pulse on the protective window that forms part of the system enclosure. This first pulse can be used for a calibration step of the system, which will enable absolute distance measurements. The center location of this pulse within the waveform may then be defined as the origin of the horizontal axis of the displayed waveforms, namely the location at which the distance is set equal to zero, the offset being close to 4 m in FIG. 6. The to second pulse is an echo-back signal from an object at approximately 29 m considering the offset. If the system distance calibration has some drift, due to temperature changes for example, it can be readjusted based on the position of this first pulse in the waveforms. The traffic detection system can also offer the possibility of providing weather information like the presence of fog, rain or snow conditions. Fog, rain and snow are environmental particles which have an impact on the reflection of the radiated light pulses off the protective window. In the presence of fog, the peak amplitude of the first pulse exhibits sizable time fluctuations, by a factor that may reach 2 to 3 when compared to its mean peak amplitude level. Likewise, the width of the first pulse also shows time fluctuations during these adverse weather conditions, but with a reduced factor, for example, by about 10% to 50%. During snow fall, the peak amplitude of the first pulse visible in the waveforms generally shows faster time fluctuations while the fluctuations of the pulse width are less intense. Finally, it can be noted that a long-lasting change in the peak amplitude of the first pulse can be simply due to the presence of dirt or snow deposited on the exterior surface of the protective window.

In one example embodiment of the system, the waveform averaging is implemented in the form of mobile averaging, wherein the current average waveform is continuously updated by summing it with a newly-acquired waveform while rejecting from the average the waveform that was first acquired. Using a mobile average does not impact on the rate at which the output detection data is generated by the Control and Processing Unit. Moreover, a timely detection of a vehicle that appears suddenly in a lane can be enabled by resetting the mobile average when a newly-acquired waveform presents at least one feature that differs appreciably from the current average waveform.

4—Methods for Alignment and Detection of the Traffic Detection System

A method that allows a rapid and simple alignment step for the traffic detection system after it has been set in place is provided.

Figure 7:
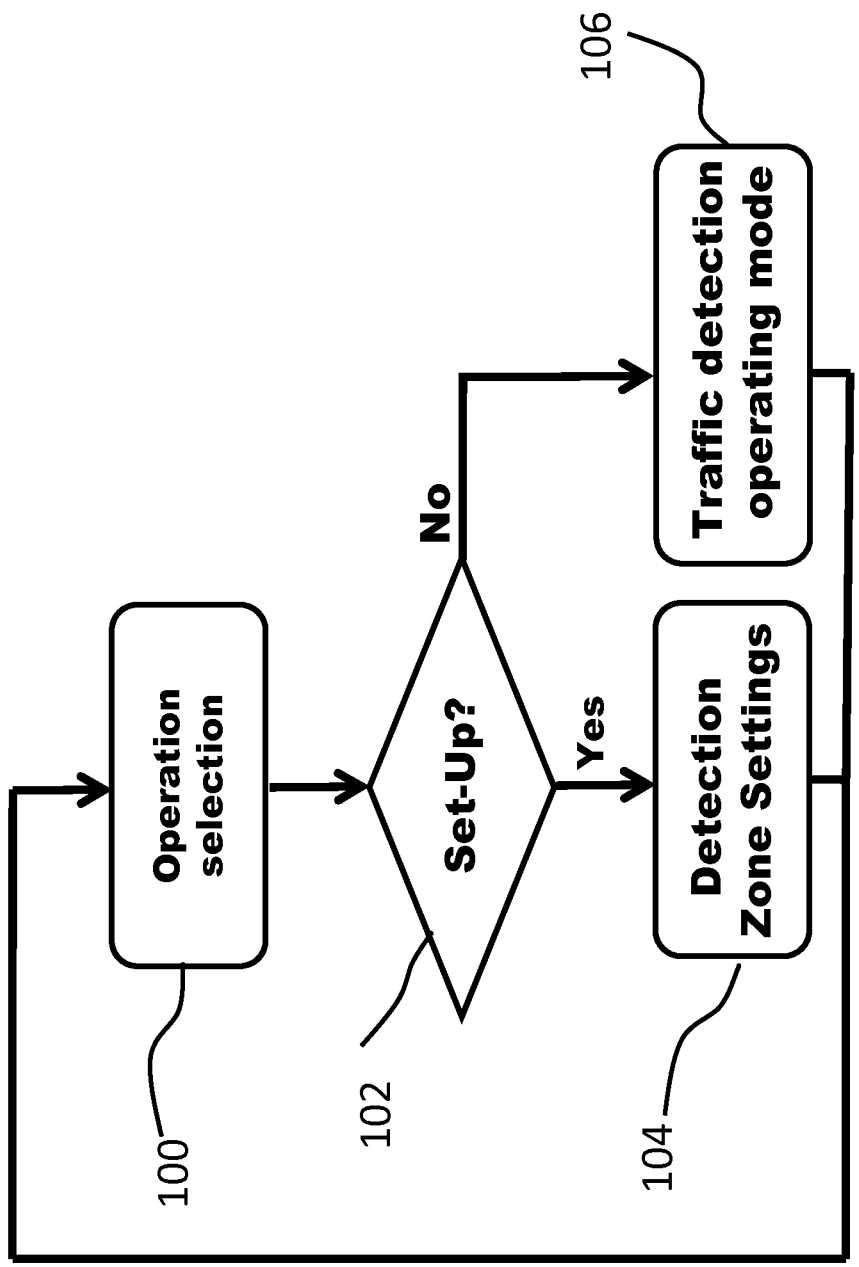
FIG. 7 is a flowchart showing two example modes of sensor operation.

FIG. 7 shows one example embodiment in which two modes of sensor operation are defined. At step 100, the system receives the information for the operation and it determines in which status it is at set-up 102. If the status indicates "system configuration", then step 102 is followed by step 104 determining parameters for the installation. Otherwise, to the next step will be the traffic sensor operating mode 106. At the end of those operation modes, the user can reselect one of these two modes.

Figure 8:
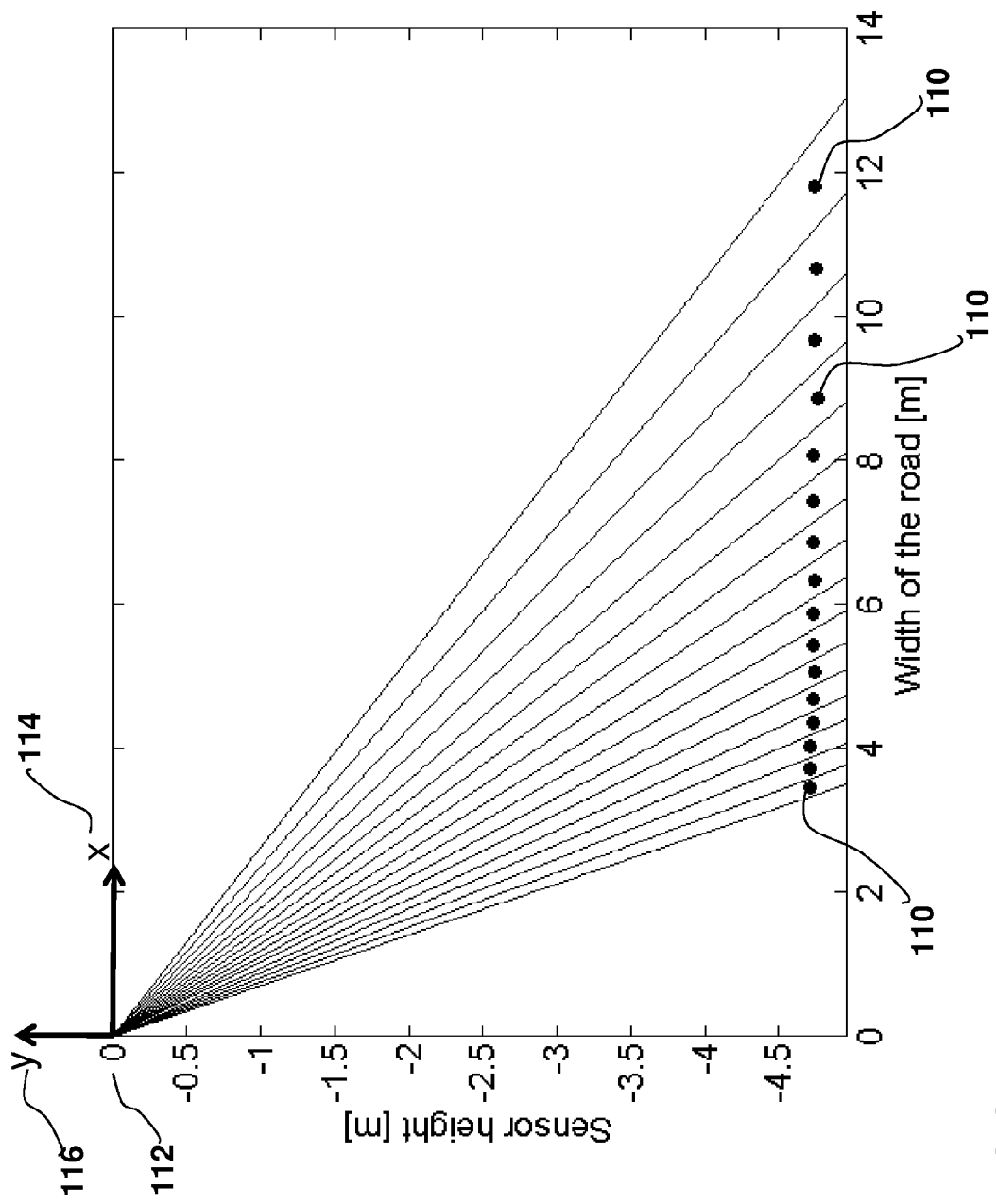
FIG. 8 shows a result of an example road detection in a Cartesian coordinate system.

FIG. 8 shows the automatic calibration of the sensor based on the road detection during the configuration step. The diagram illustrates how the optical signal waveforms captured by the traffic detection system can be used to calibrate the system. The calibration process refers in the present context to the conversion of the time at which the roadway is free of any object, that is a time at which there is no echo-back signal from a vehicle, along the detection zone, thus allowing to measure the distance to the ground in several channels but not necessary in all channels of the traffic detector. In this example, the traffic detection system 10 gives 16 detections 110 representing the distance of the ground for each individual FOV of the sensor. In Cartesian coordinate system, if the traffic detection system 10 represents the origin 112, the horizontal direction from left to right is taken as the positive x-axis 114, and the vertical direction from bottom to top is taken as the positive y-axis 116 then, each road detection 110 gives the sensor height with the distance between the road and the sensor. Assuming that the road is locally planar and that the different detections located in the detection area have small variations, the sensor height, the distance between the sensor and the road and the tilt angle of the sensor are obtained using standard statistical algorithms such as regression analysis, a least square method.

The intensity of the echo back signal is dependent on the condition of the road. A dry road has a higher intensity than a wet road. A road covered with black ice will have the lowest intensity due to the specular effect of the ice. Snow typically increases the intensity. The condition of the pavement can be monitored during installation and also during normal operation.

Figure 9:
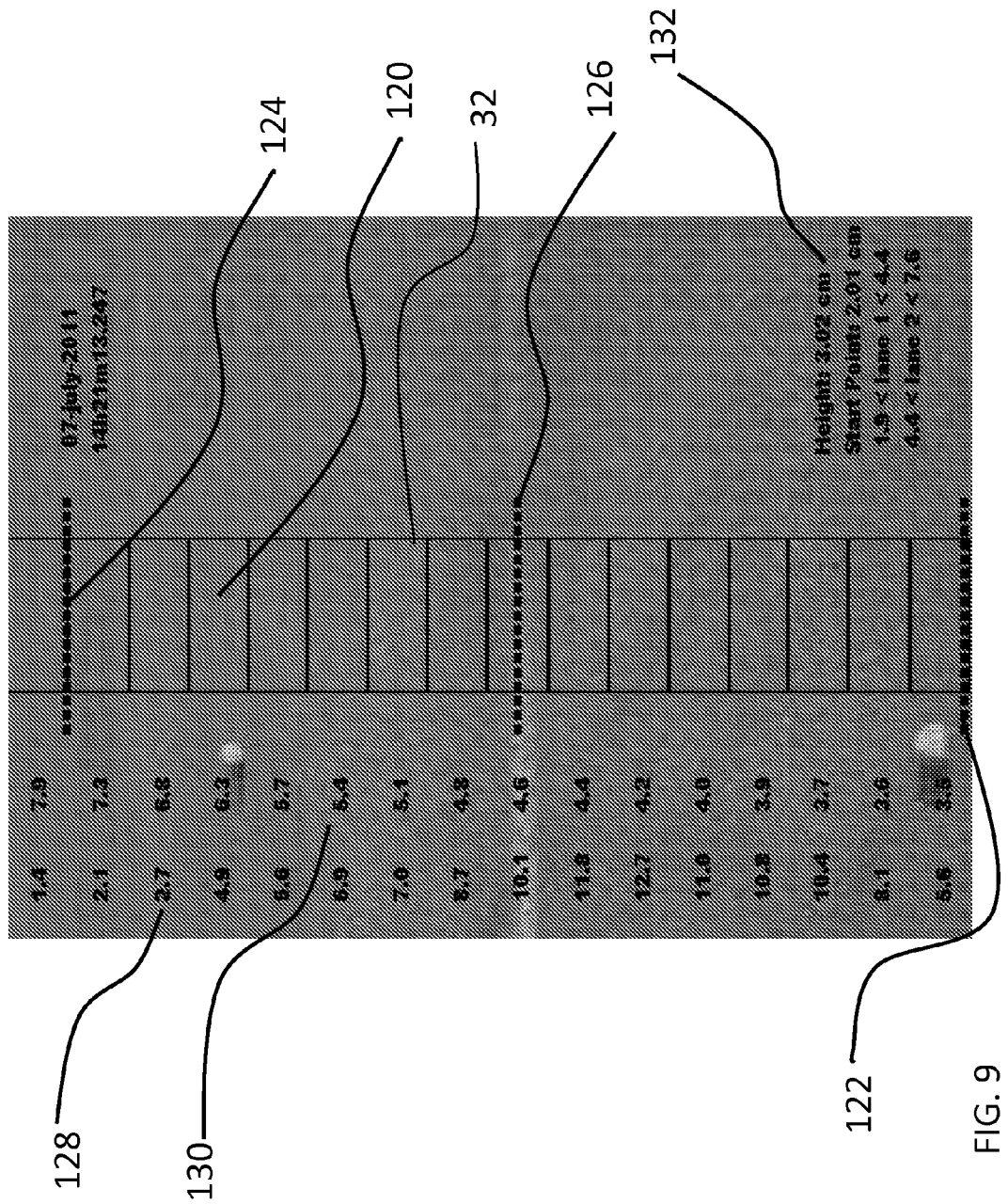
FIG. 9 is a photograph which shows a result of an example automated calibration where the 3D sensor field-of-view is projected on the video image.

FIG. 9 shows an automatic calibration example from a video image of the device. The FOV of the 3D sensor 120 is represented by the grid overlay 32. The detection area is defined by the user such that bracket 122 sets the beginning of lane 1 and bracket 124 sets the end of lane 2. Bracket 126 allows defining the border between lane 1 and lane 2. Amplitude data 128 of the echo back signal and polar distance 130 of road detections are indicated next to the respective FOV. The sensor height 132 and the lane configuration are located at the bottom-right corner.

Figure 10:
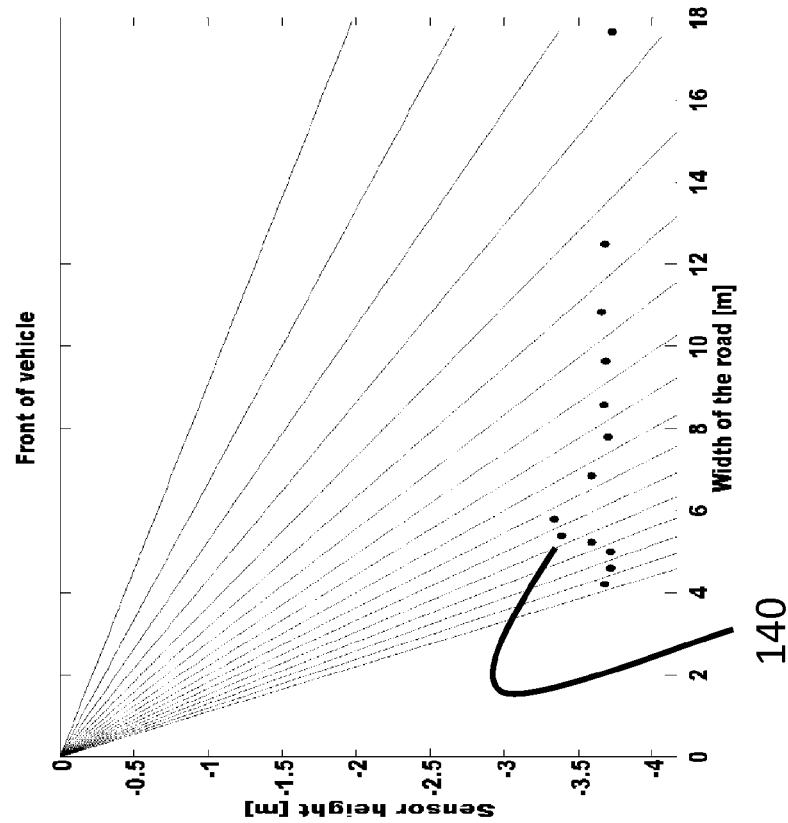
FIG. 10 includes FIGS. 10A, 10B, 10C, 10D, 10E, 10F, 10G and 10H which are photographs (10A, 10C, 10E, 10G) and graphs (10B, 10D, 10F, 10H) of four different example vehicle positions during the detection of a vehicle.
Figure 10:
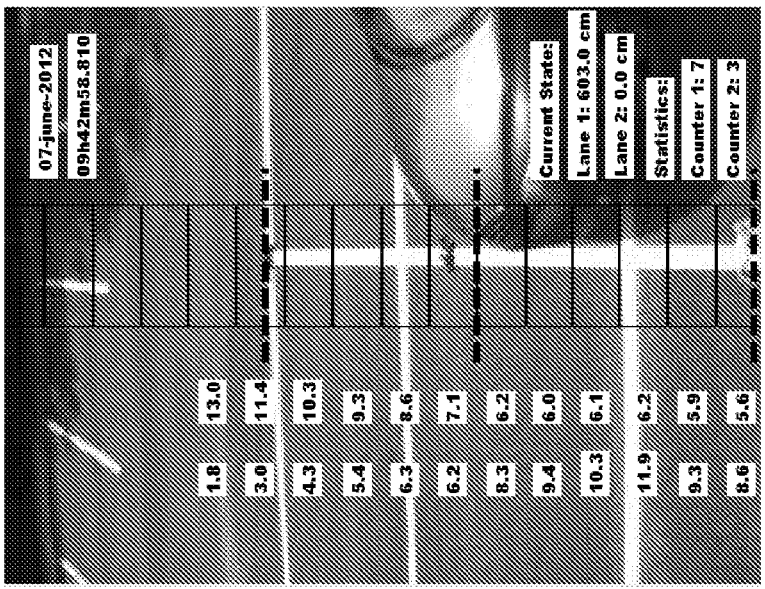
Figure 10:
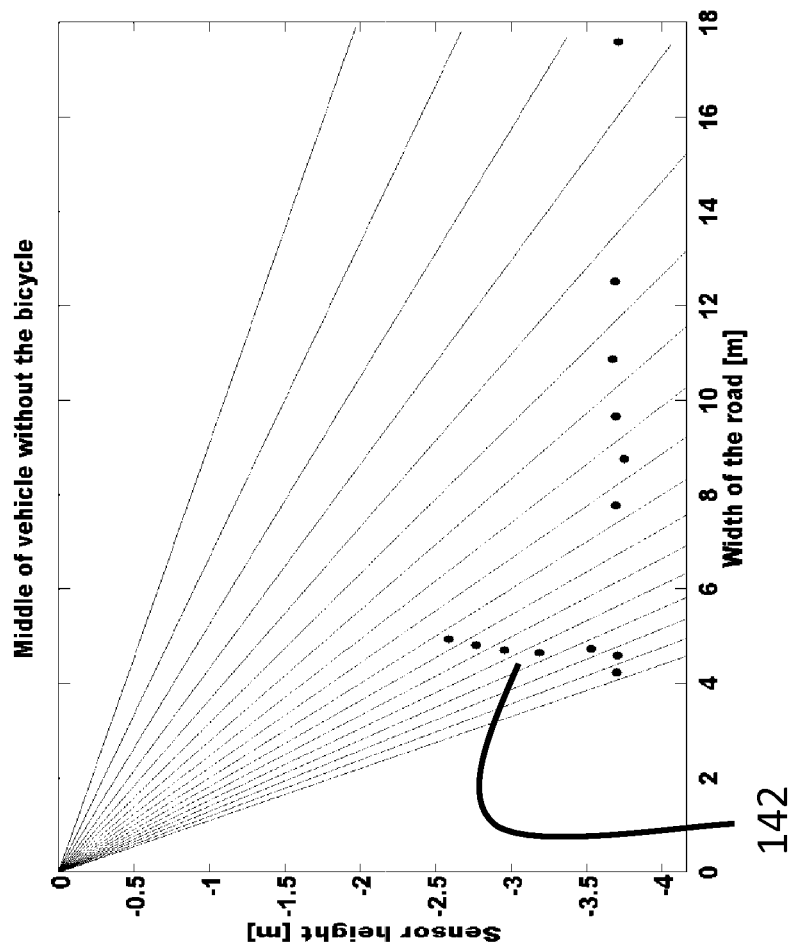
Figure 10:
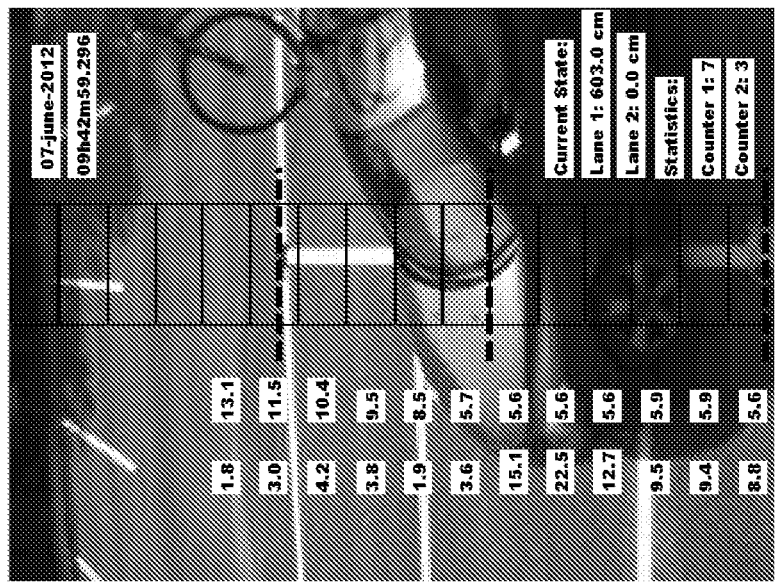
Figure 10:
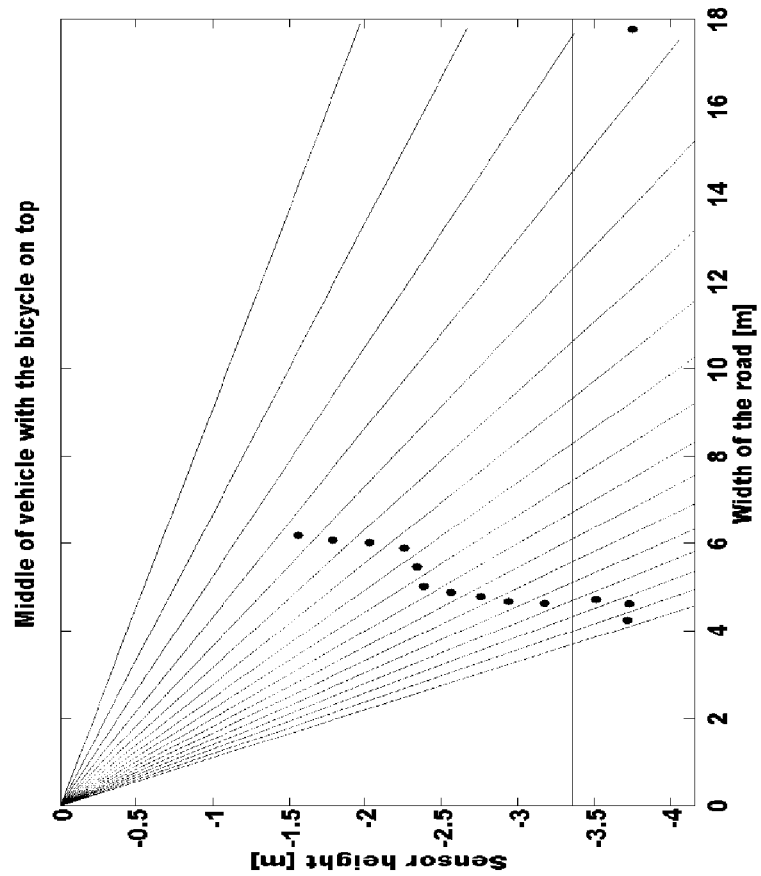
Figure 10:
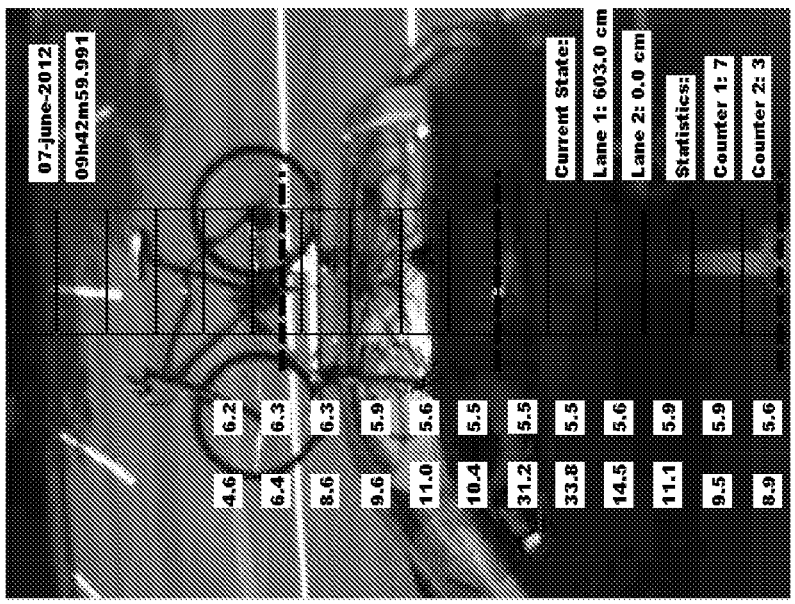
Figure 10:
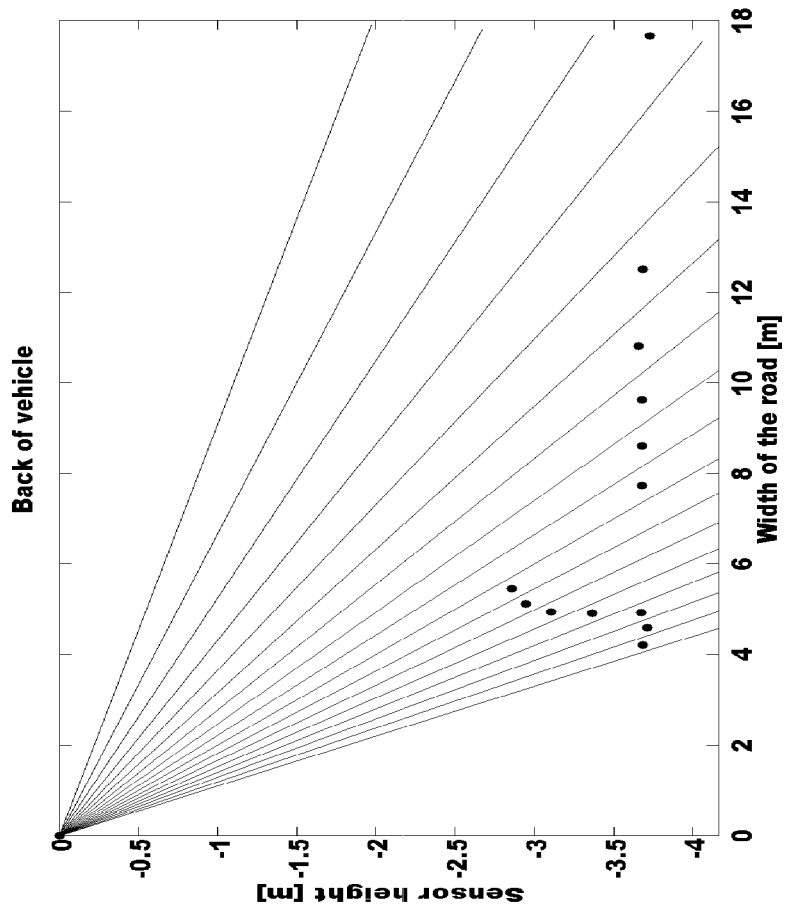
Figure 10:
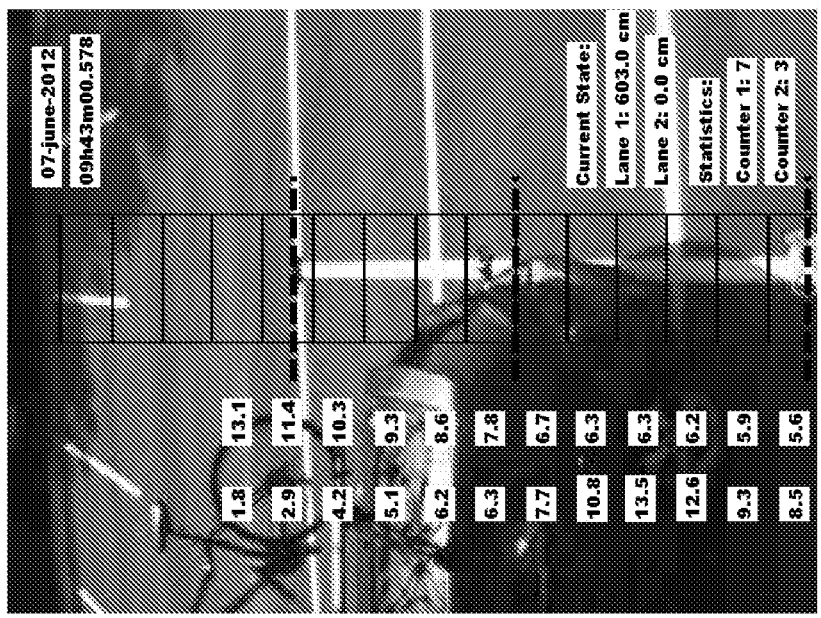

FIGS. 10A, 10B, 10C, 10D, 10E, 10F, 10G and 10H illustrate results of the detection of the four typical parts of a vehicle. When a vehicle enters in the 3D sensor FOV, FIG. 10A shows an image of the front of a detected vehicle and FIG. 10B shows two detections 140 that are clearly not echo back signals from the road but rather signals from the front of vehicle. FIG. 10C shows the vehicle when the windshield enters the detection zone and FIG. 10D shows that the number of channels in which the vehicle is detected increases and that the height of the detected vehicle portion increases in detection region 142. FIG. 10E shows the detected vehicle with a bicycle installed on top and FIG. 10F shows the profile of the side of the vehicle with a bicycle on top. Finally, FIG. 10G shows the vehicle leaving the detection zone when the 3D sensor detects the ground again in FIG. 10H. This sequence shows that it is possible to detect the front, the side and the end of a vehicle and to obtain the profile of the vehicle. It is possible to determine in which lane the vehicle has been detected, the volume of vehicles over time by counting each detection of a vehicle and the occupancy of the road, even if the percentage is high. It is also possible to detect an accessory, in this case a bicycle and a rack, installed on the roof of a vehicle and to distinguish this height-enhanced vehicle from other vehicle having a higher standard height.

As will be readily understood, when the system is installed on the side of the roadway, the detection of the front of the vehicle is actually a detection of the side of the front of the vehicle and the detection of the rear of the vehicle is actually a detection of the side of the rear of the vehicle. The "middle" or "side" of the vehicle has a varying length depending on the type of vehicle circulating on the roadway. This region or section of the side of the vehicle is located between the front (the side of the front) and the rear (the side of the rear) of the vehicle and it includes the mathematical or geometrical center or middle of the side of the vehicle. However, because the side of the vehicle can have an extended length, it is possible that different detections of the side or middle of the vehicle will not include the actual mathematical or geometrical center or middle of the vehicle. Similarly, when the system is installed under a lateral beam of a gantry provided above the roadway, the front and rear sections of the vehicle are the top of the front and the top of the rear of the vehicle. Again, the "middle" or "top" of the vehicle have a varying length depending on the type of vehicle.

Figure 11:
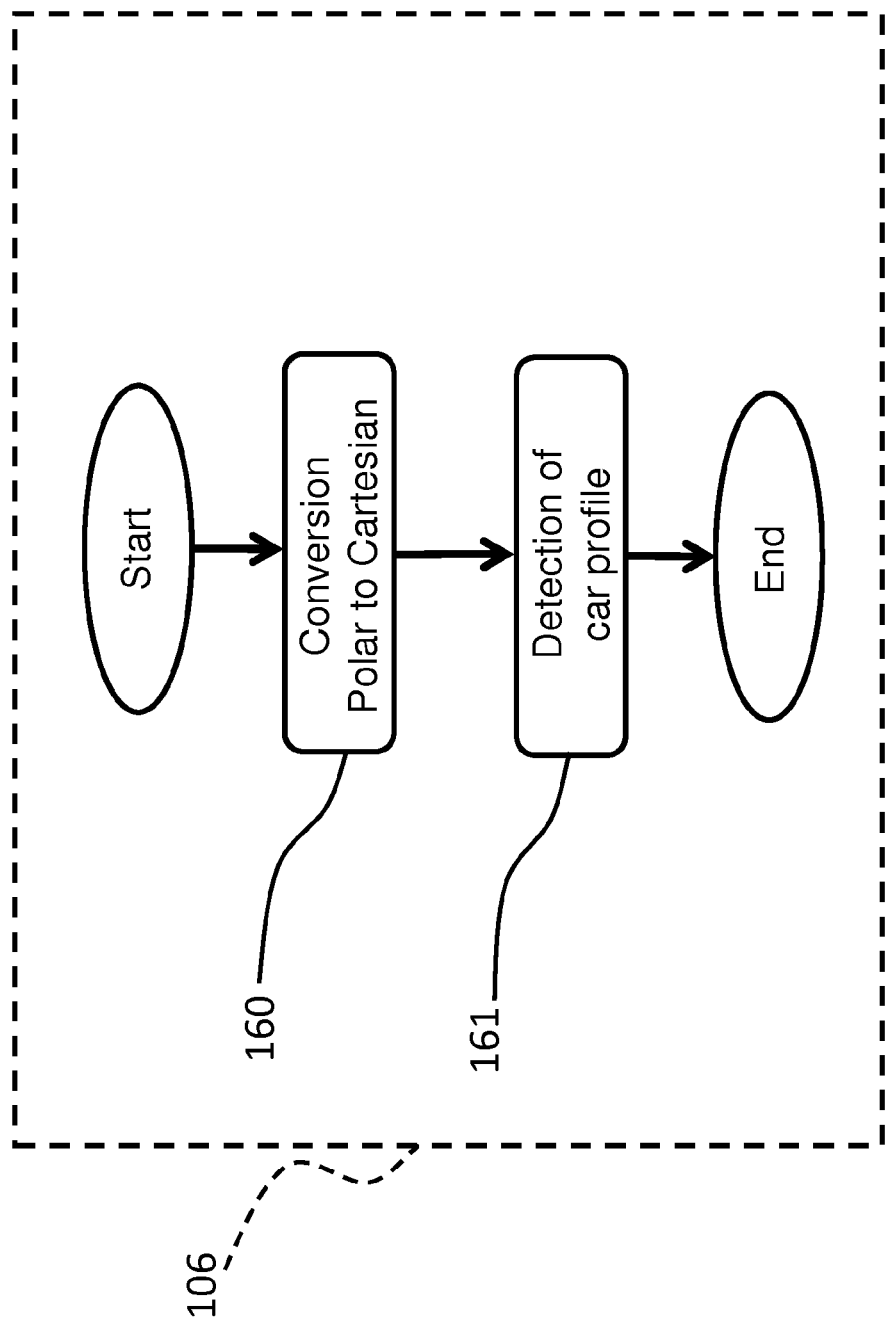
FIG. 11 is a flowchart illustrating example steps for the detection of the vehicle sides.
Figure 12:
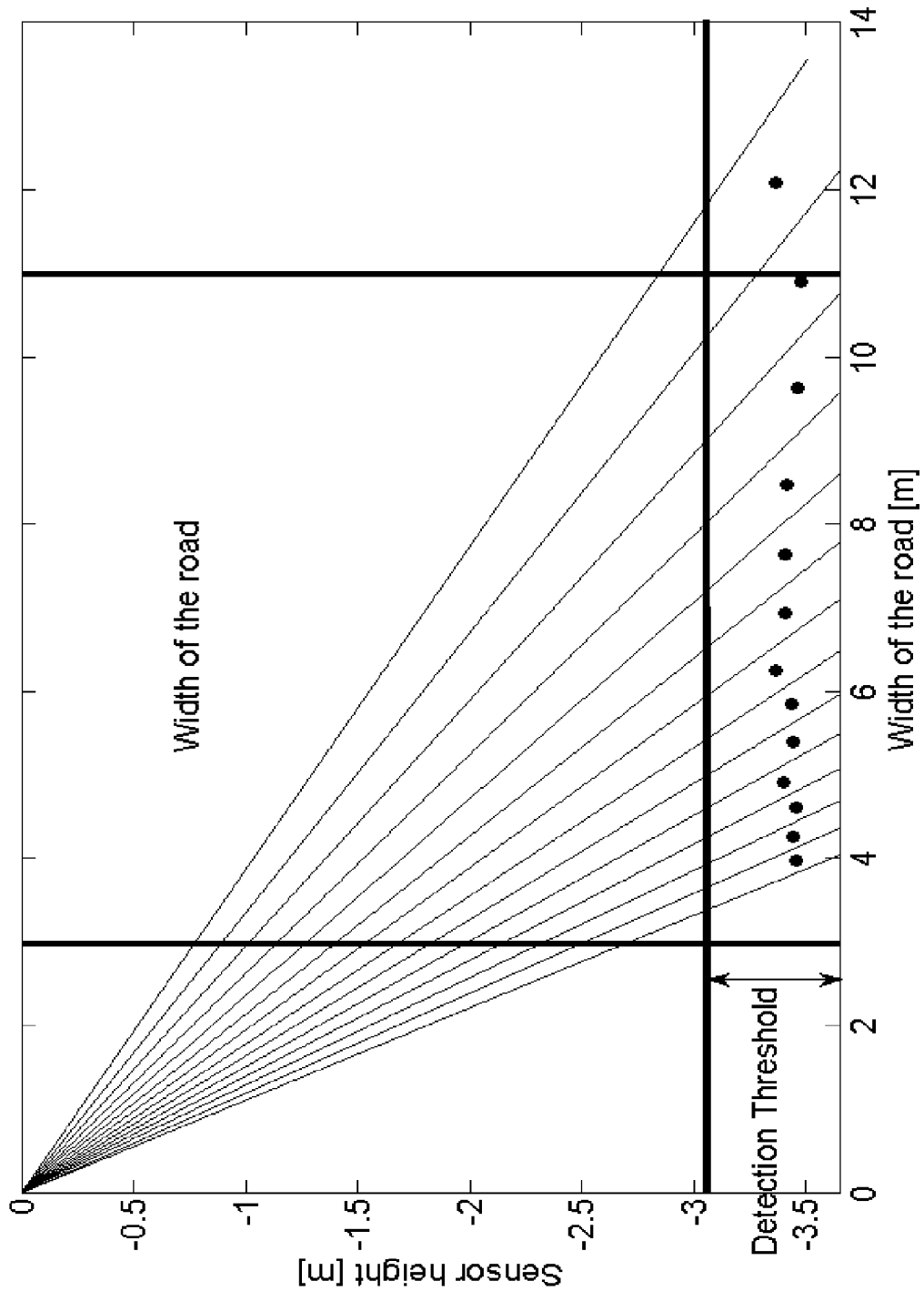
FIG. 12 is a profile graph showing an example distance measurement by the traffic detection system which detects the surface of the road without any object.

FIG. 11 shows example steps performed during the execution of the detection and classification algorithm. The events can be summarized as follows. At step 160, the algorithm reads and converts each of the available observations in Cartesian coordinates. At step 161, the algorithm will extract, model, and distinguish vehicles from a set of Cartesian measures. FIG. 12 shows an example when no detection exceeds the threshold.

Figure 13:
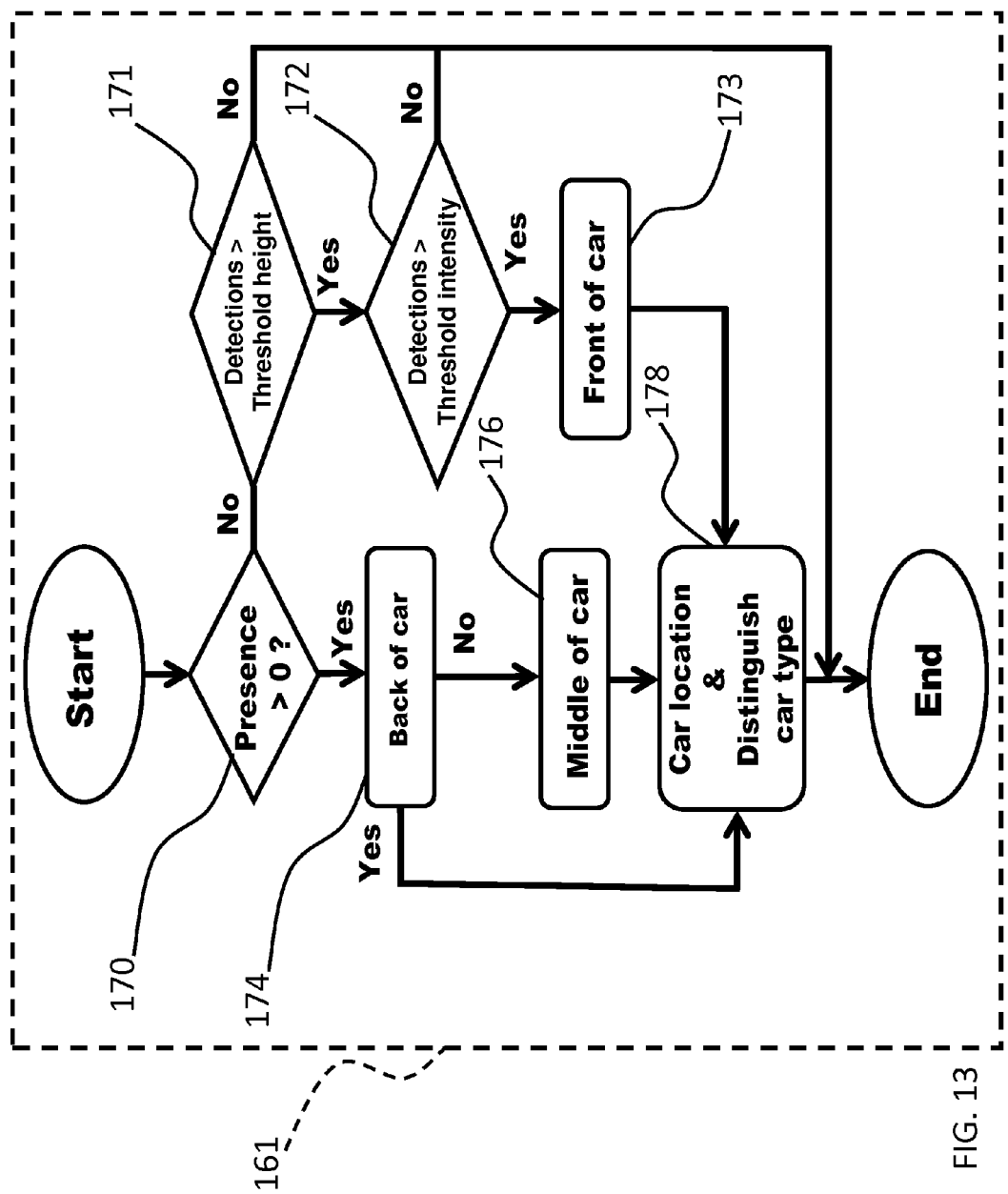
FIG. 13 is a flowchart illustrating the detection of the different parts of a vehicle profile.

FIG. 13 details step 161 of FIG. 11 and illustrates an example sequence of events that the detection and classification algorithm uses to successfully count and classify vehicles detected by the sensor. At step 170, the detection algorithm of the car profile starts by determining if a vehicle is currently located in the field of view. If a vehicle is detected, step 170 is followed by step 174 otherwise step 170 is followed by step 171. Step 171 checks the height of each detection. If the height of the detection is greater than a threshold height, step 171 is followed by step 172 otherwise the process ends. Step 172 checks the intensity of each valid detection. If the intensity of the detection is greater than a threshold intensity, step 172 is followed by step 173 otherwise the process ends. At step 173, the detection algorithm of the car profile detects the start of a vehicle and sends a trigger message. Step 174 determines if the vehicle leaves the detection zone, namely if the back of the car is detected, and sends a trigger message. Some sub-steps of step 174 are detailed in FIG. 16. Otherwise, step 174 is followed by step 176. In step 176, the detection algorithm of the car profile, because it has detected the middle of the car, computes the lateral distance, the vehicle height and the number of axles. Finally, steps 173, 174 and 176 are followed by step 178 which groups all valid detections into several clusters. A cluster is a group of points close to each other. The channel with the lowest height in the cluster is selected as the position of the vehicle on the road. The cluster also contains geometrical information which can be used to classify vehicles.

Figure 17:
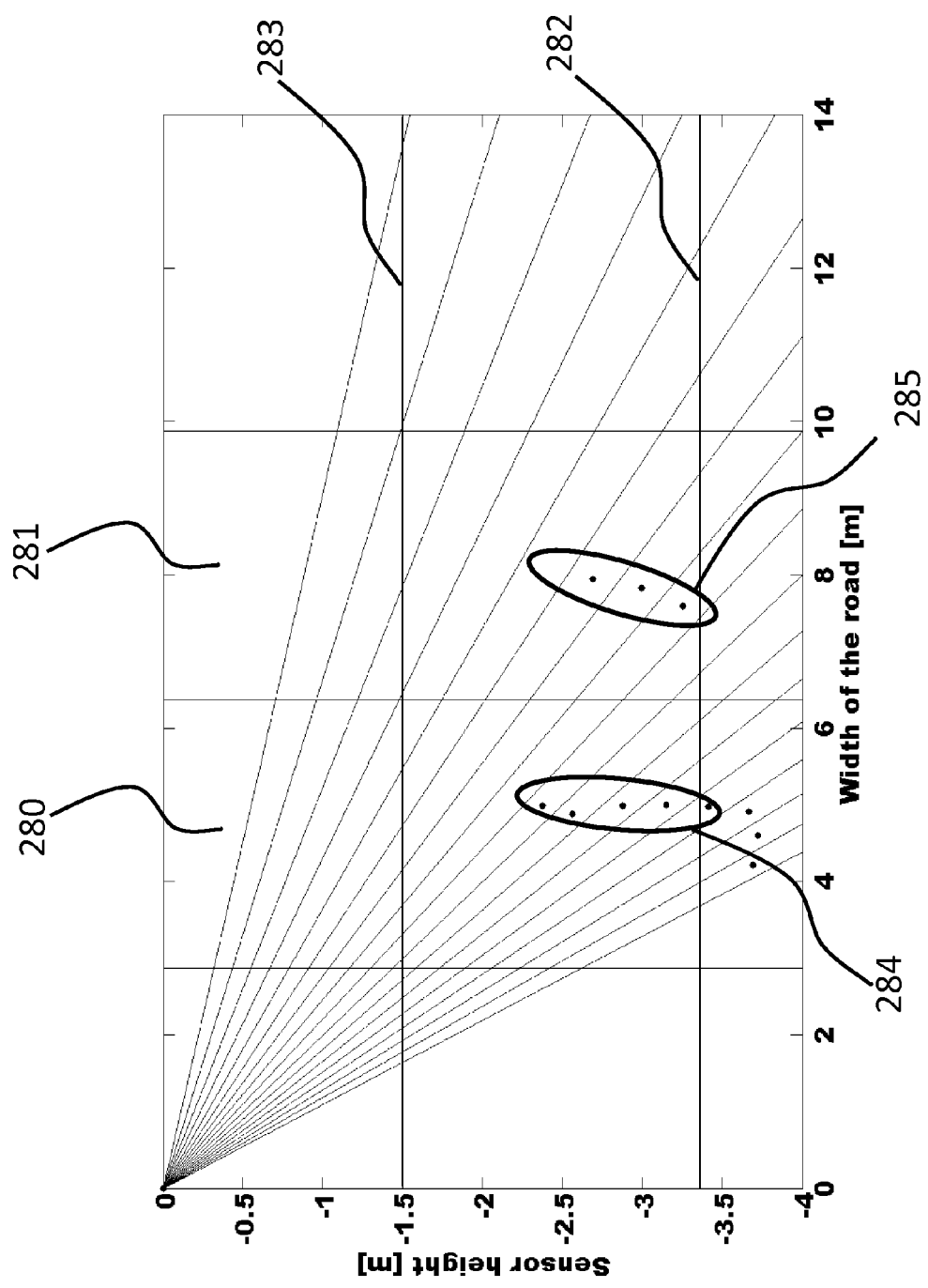
FIG. 17 illustrates an example of the detection of two vehicles on two different lanes.

FIG. 17 shows two detected objects 284 and 285, object 284 is in lane 280 and object 285 is in lane 281. The position of objects 284 and 285 is determined using a group of detections from several adjacent channels. The detection threshold 282 and the classification threshold 283 between a heavy vehicle and a lightweight vehicle are shown. A heavy vehicle will have a height above the classification threshold 283 and a lightweight vehicle will have a height equal to or lower than the classification threshold 283. Any detection lower than the detection threshold 282 will be ignored. This single frame allows determining the following: two vehicles are detected, the distance between the vehicle located in lane 1 and the sensor is 5.0 m, the distance between the vehicle located in lane 2 and the sensor is 7.6 m, the height of the vehicle located in lane 1 is 1.4 m and the height of the vehicle located in lane 2 is 1.2 m. In order to determine the height of the vehicles, the height of the ground (at about −3.8 m) is subtracted from the height of the highest detection (at about −2.4 m for vehicle 284 and at about −2.6 m for vehicle 285). Both vehicles are therefore classified as lightweight vehicles. A more complex analysis can be made using the complete profile information to distinguish between lightweight vehicles and heavy vehicles. As we can seen in FIGS. 10E and 10F, a car with a bicycle installed on its roof can generate detections above the classification threshold but the analysis of this profile will allow detecting and discriminating the bicycle on the roof and will allow classifying this vehicle as a lightweight vehicle even with a detection located above the classification threshold.

5—Methods for Reducing the Effect of Water Splashing Behind Vehicles

Figure 14:
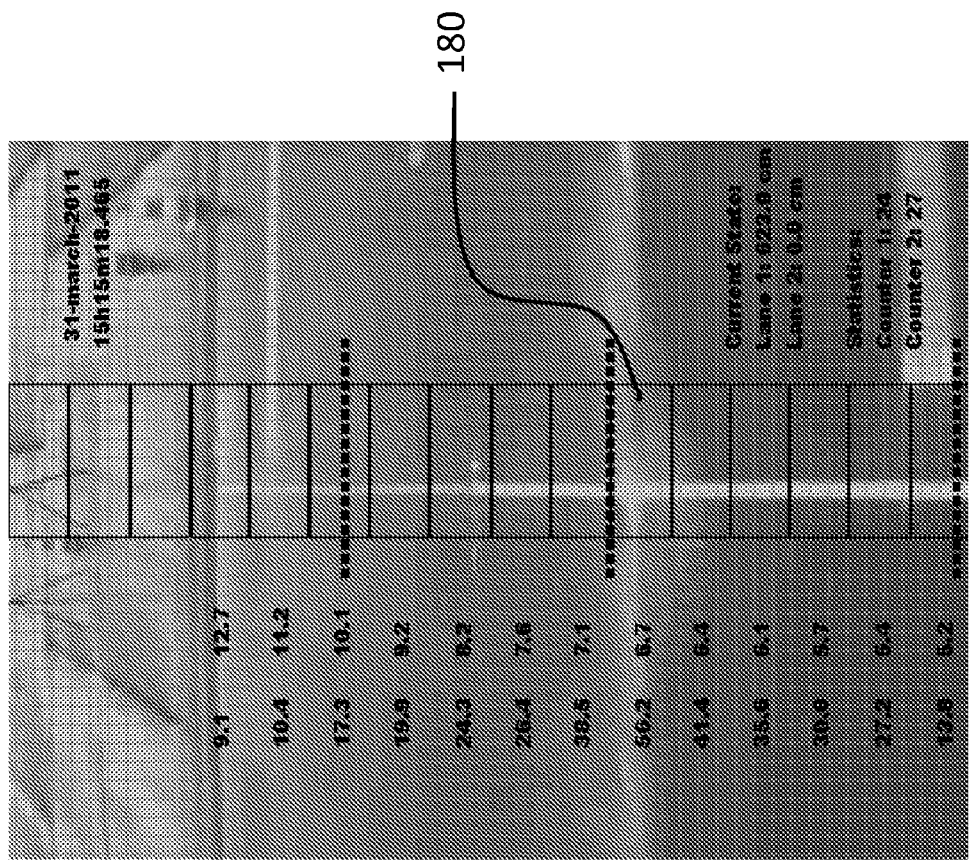
FIG. 14 is a photograph showing an example splash of water behind a vehicle caused by rain or water on the pavement.
Figure 15:
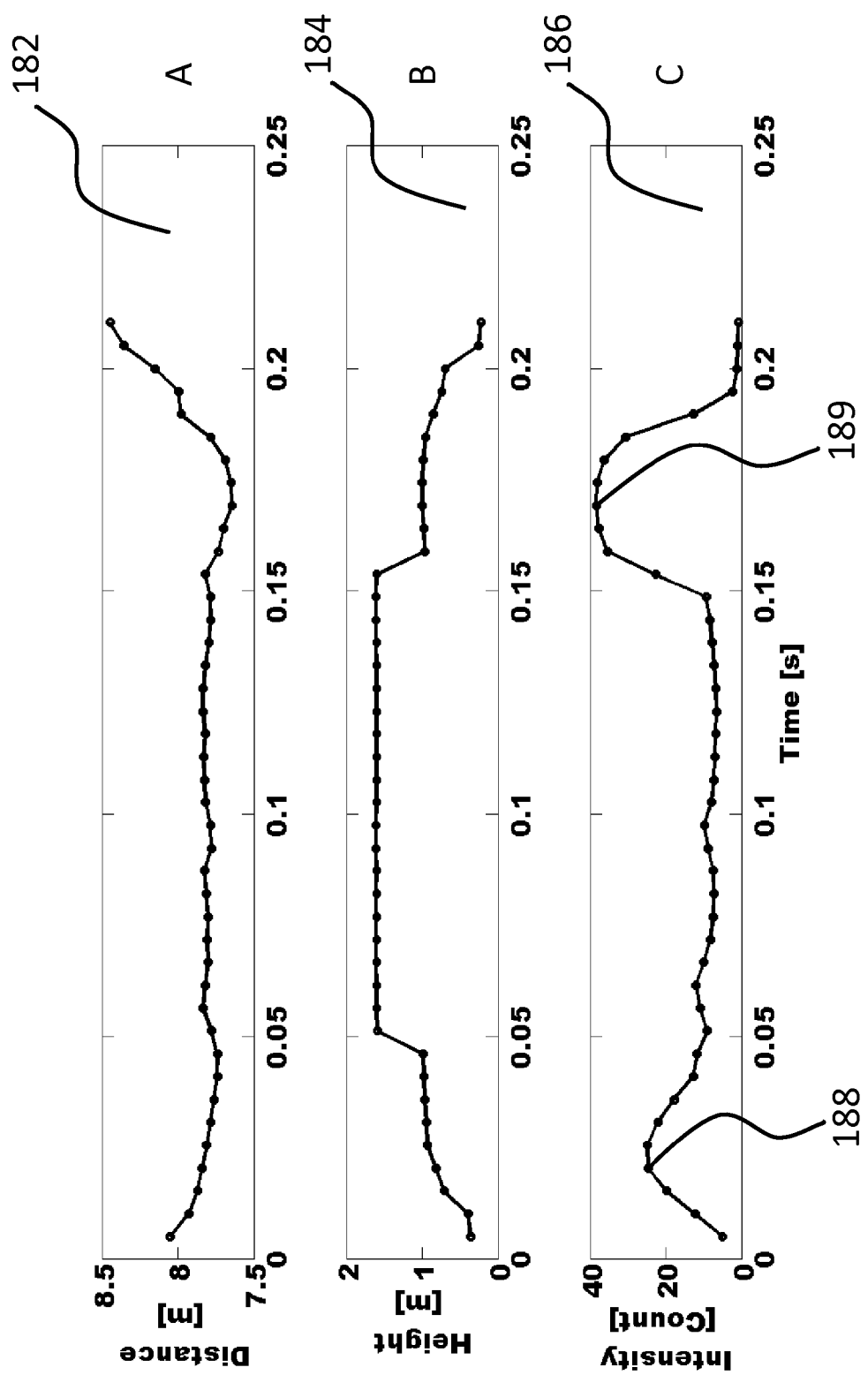
FIG. 15 includes FIGS. 15A, 15B and 15C which show example acquisitions with water spay behind the detected vehicle.

Most sensors such as video cameras, lidars or short wave infrared imagers are not able to distinguish between a detection of the vehicle and a detection of the water behind the vehicle. Water splashing is caused by the accumulation of rain, an environment particle, on the roadway. The accumulated rain is lifted by the tires of the moving vehicle and creates a splash behind the vehicle. An example water splash is shown in FIG. 14 where the trigger associated with the back of vehicle is very late 180. However, it has been observed that the reflection from water splashing can be distinguished from the reflection of the vehicle. Indeed, as shown in FIG. 15, at least three features can distinguish the vehicle and its water splashing. First, in FIG. 15A, the distance 182 between the sensor and the vehicle decreases during the vehicle detection and increases during the water detection. Second, in FIG. 15B, the height 184 of the vehicle increases during the vehicle detection but decreases during the water detection. Third, in FIG. 15C, the front 188 and rear 189 vehicle reflectors, which are visible with a high intensity 186 from the sensor position, can be detected.

Figure 16:
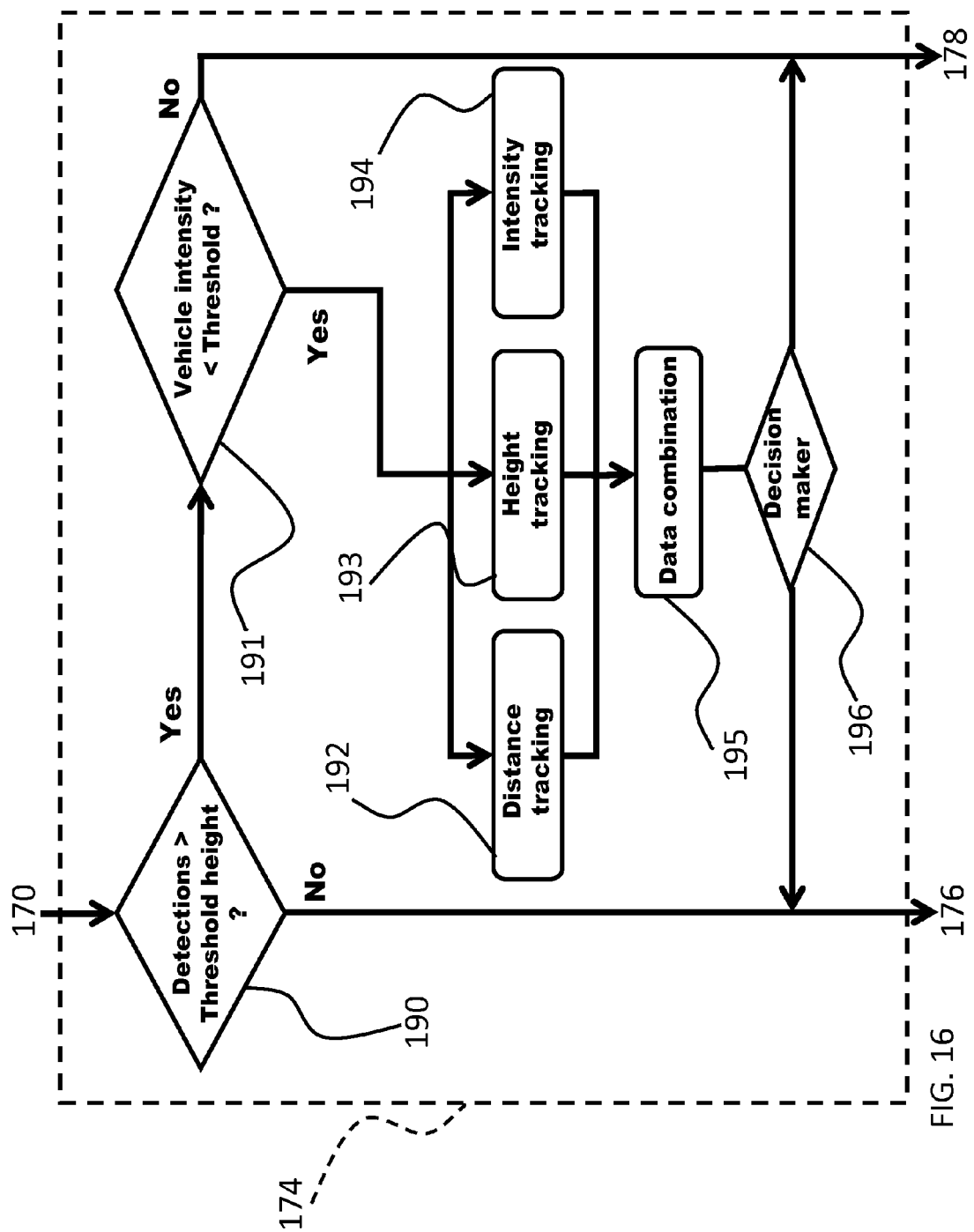
FIG. 16 is a flowchart illustrating an example method for reducing the impact of water splashing behind vehicles on the detection of the vehicle.

FIG. 16 details some sub-steps of step 174 of FIG. 13 and shows a flowchart for an example method for reducing the impact of water splashing behind vehicles on the detection of the actual vehicle. Step 190 consists in verifying if each detection has a greater height than a threshold height. If that is not the case, step 190 is followed by step 176. If that is the case, step 190 is followed by step 191. Step 191 checks if the vehicle intensity is below the threshold intensity. If the condition is true, step 191 is followed by steps 192, 193 and 194 otherwise step 191 is followed by step 178. Step 192 detects when the distance between the sensor and the detected object increases significantly. Step 193 detects when the height between the sensor and the detected object decreases significantly. Step 194 detects the two amplitude peaks corresponding to the front and rear vehicle reflectors. Step 195 combines the outputs from each of the trackers to determine a probability that a water splashing event has been found. There exists several different ways of combining the outputs, including probability combination, rank combination, voting, average combination and weighted combination. In an example embodiment, average combination is used. If the result of the average combination is higher than a threshold, namely the cluster has a "water splashing" signature, step 196 is followed by step 178 otherwise step 196 is followed by step 176 which means that the vehicle is detected without a water splashing signature.

6—Speed Measurement

Figure 18:
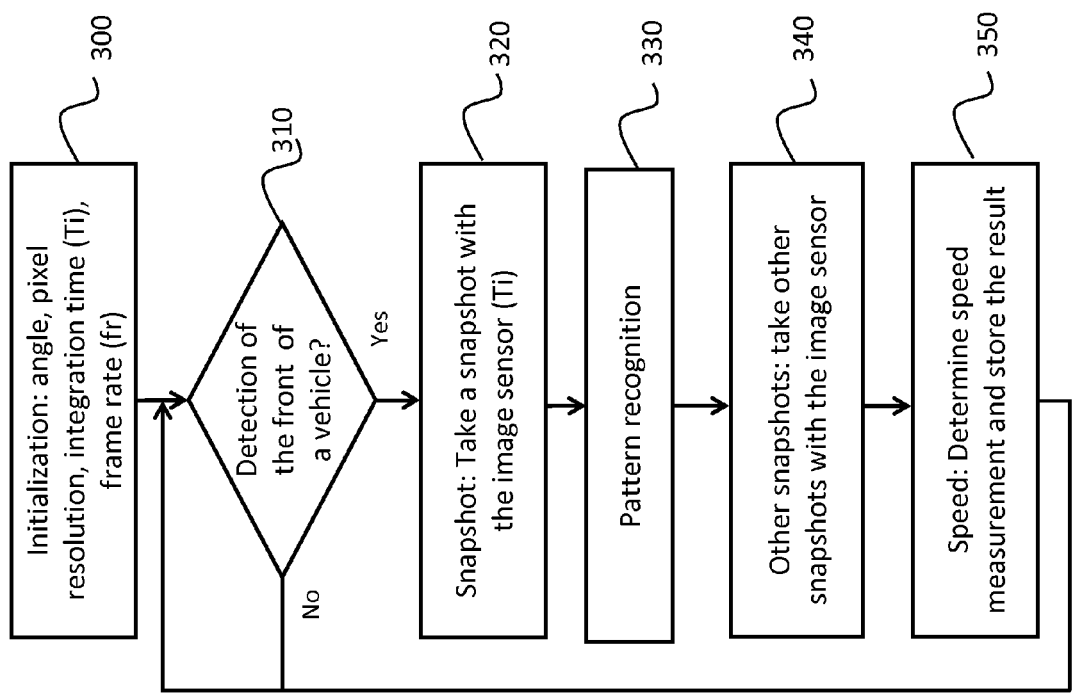
FIG. 18 is a flowchart of an example algorithm for speed measurement.

FIG. 18 shows a flowchart illustrating a speed measurement method using fusion of information from the 3D sensor and the image sensor. At Initialization 300, the method sets several parameters before initiating speed measurement. The value of the optical angle of the FOV and the pixel resolution of the image sensor are two parameters stored in the system that permit to determine the relationship between the equivalent lateral distance of a pixel as a function of the distance to the object as seen by the image sensor in the FOV of the pixel. The to lateral resolution based on the number of pixels of the image sensor varies as a function of the longitudinal distance. For example, for an image sensor with 640 pixels per line (640 columns) with a field of view of 36 degrees, the equivalent lateral resolution for a pixel in the middle of the line of the image sensor for an object at 10 m would be approximately 1 cm. Integration time and frame rate are other parameters to be set in that initialization phase.

Then, the system waits for the detection of the front of a vehicle 310 by the 3D sensor. After detecting the front of a vehicle, the system takes a snapshot 320 with the image sensor. At pattern recognition 330, the system analyzes the image to find a predetermined pattern in the image and determines its position (x0, y0) in the image and the distance if the pattern is in the FOV of the 3D sensor. The circular pattern of a wheel and a bright spot at night are good examples of patterns to be recognized. After pattern recognition, this pattern is tracked by taking at least one other snapshot 340 at a certain frame rate (fr) and determining each new position (xn, yn) of the pattern. At each iteration, the method analyzes if the pattern is in the overlay of the 3D sensor and, if it is the case, sets the distance of the pattern based on the information from the individual channel in the 3D sensor fitting with the position of the pattern. After at least two iterations with at least one iteration where the pattern has been recognized in the overlay to determine its distance, the data position of each iteration with the corresponding longitudinal distance measurement are analyzed for speed measurement. Lateral displacement based on each position of the pattern detected can be determined and this information can be filtered, using a Kalman filter for example. The measurements of several positions each memorized with a time stamp are used to estimate the speed 350 of the vehicle.

The pattern recognition process which uses wheels as a pattern to be recognized in the image is as follows. The first snapshot has been taken when the front of the vehicle entered the 3D detection zone shown in overlay. Any vehicle having a wheel on the ground relatively close to its front is detected by the 3D sensor. The Region of Interest (ROI) of the wheel can be defined considering the direction, the distance of the vehicle, the position of the ground and the channel(s) detecting the front of the vehicle. Wheels locations are delimited to a region close to the road and relatively close to the front of the vehicle. Several techniques can be used to detect circular shapes. Sobel edge detection and Hough transform, and its variations, are well-known pattern recognition techniques used to identify shapes like straight lines and circles and can be used to recognize wheels. Once the circular shape of the wheel is detected, the center point can be determined. The sequence information of the tracking of the pattern confirms the direction of movement of the vehicle and can be used as a wrong-way driver detection and warning system.

Figure 19:
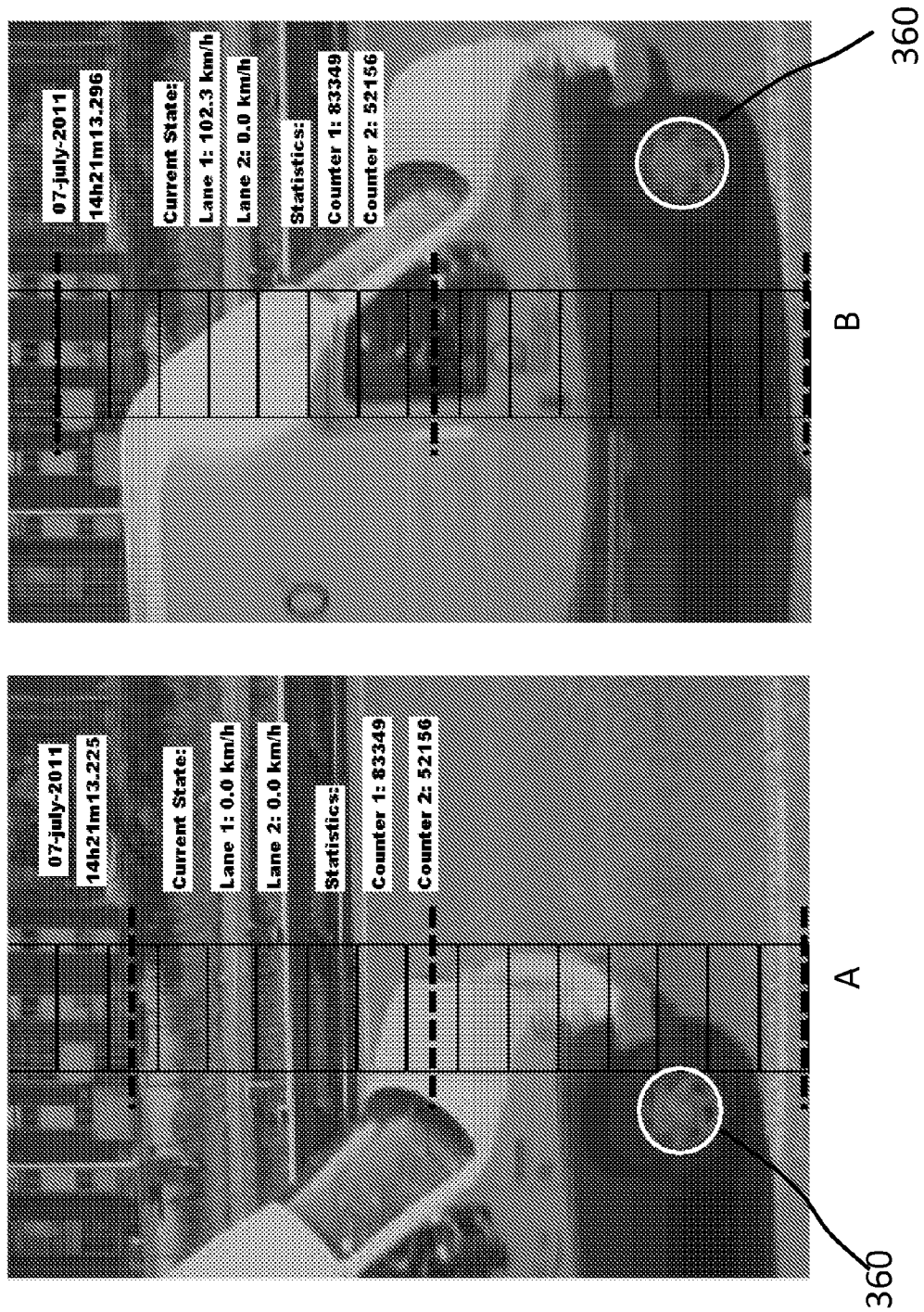

FIG. 19A shows an image taken by the image sensor when the front of a vehicle is detected by the 3D sensor. Based on the precedent assumption of the position of the wheel, the ROI to locate a pattern, for example circle 360, can be defined with respect to the distance measurements of the ground and the side of the vehicle. The pattern, namely circle 360, can be recognized. Another snapshot is taken at a predetermined elapsed time and can be seen in FIG. 19B. The pattern, namely circle 360, can be recognized and its position can be determined and speed estimation can be made based on displacement over a predetermined elapsed time.

Near Infrared imaging, using an IR illumination source, not shown, can be used. It allows using the same pattern during daytime and nighttime and can help reducing sensitivity to lighting conditions.

At night, a lighting module on the vehicle can be used as a pattern to be recognized and tracked. When the front of a vehicle is detected, at least one lighting module in that area can be clearly distinguished based on the intensity of the illumination and a group of pixels, or blob, based on an intensity level higher than a threshold can be found. This blob can be tracked in the same way as the wheel and speed measurement can be done.

In another example embodiment, the speed measurement is based on the detection of a retroreflector. A retroreflector has a surface which reflects incoming light towards the source of illumination with practically no scattering effect if the angle of incidence is not too high, for example less than 45 degrees. When the traffic detection system has a reflector in its FOV, a very strong echo back signal is perceived by the Optical Receiver Module (ORM) and the amplitude of the signal is much higher to compare to a Lambertian reflectance type surface which has a diffusely reflecting incoming signal. In most countries, for any type of motor vehicle, the regulations require manufacturers to install retroreflectors on the sides of the vehicle, at least one on each front side and one on each rear side. When this retroreflector is in the FOV, a strong signal is acquired by the traffic detector system during the time the retroreflector is in the FOV of the ORM. Knowing the width of the FOV of the ORM in degrees (A), knowing the distance (D) of the retroreflector from the detector and knowing the time (T) that the retroreflector has spent in the FOV and generated a strong signal, the speed (S) of the vehicle can be estimated with the following equation:

$$S=2*D*TAN(A/2)/T$$

The system can also approximate the length (L) of the vehicle by storing a timestamp for the front side retroreflector (TO and storing another timestamp for the rear side retroreflector (Tr) using the following equation:

$$L=S*(Tr-Tf)$$

Usually, there are intermediate side retroreflectors for long vehicles, such as vehicles which are longer than 9.144 m (30 feet) for example. Because the system is adapted to detect the front, the middle and the end of the vehicle, it is possible to make an association between the front of the vehicle and the front retroreflector and the end of the vehicle with the rear retroreflector for length measurement, even in the context of a vehicle with an intermediate side retroreflector.

In one other example embodiment, speed measurements can be made using two traffic detection systems. A configuration using two sensors per lane, one on each side of the lane, installed under a transversal beam of a gantry for example, is useful to detect and profile both sides of any vehicle. In that configuration, the detectors are synchronized to collect information and the shape of a vehicle. When the position of each sensor is known, the width and height can be determined. If two traffic detection systems are installed on opposite sides of the roadway with a lateral offset along the roadway, it is possible to detect the front of a vehicle with the first sensor and within a short delay, as a function of the speed and the offset, the second sensor would also detect the front of the vehicle. Knowing the offset and measuring the delay between the detection of the front of the vehicle, speed estimation can be made. With an estimation of the speed, the length can also be estimated. The same method could be carried out with the back of the vehicle. The lateral offset between the two systems could be 1 m for example.

7—Classification Categories

Fusion information can be also useful to improve classification, notably by counting the number of axels, and determine several types of vehicles. In the United States, the Federal HighWay Administration (FHWA) has defined a classification based on 13 categories of vehicles from motorcycles to passenger cars, buses, two-axle-six-tire-single-unit trucks, and up to a seven or more axle multi-trailer trucks classes. Several alternative classification schemes are possible and often the aggregation of the FHWA 13 classes is split into 3 or 4 classes. The number of axles and the distance between each axel are key elements in an algorithm to make a robust classification. Information from the 3D sensor based on a multi-channel TOF and from the image sensor with image processing analysis permits to the traffic detection system 10 to be a very efficient device for the classification function. For example, to show the strength of this traffic detection sensor, based on the knowledge of the position of the ground and the distance of the side of the vehicle, the system can determine if detected wheels are touching the ground or not. This information can be useful for classification purposes.

Figure 20:
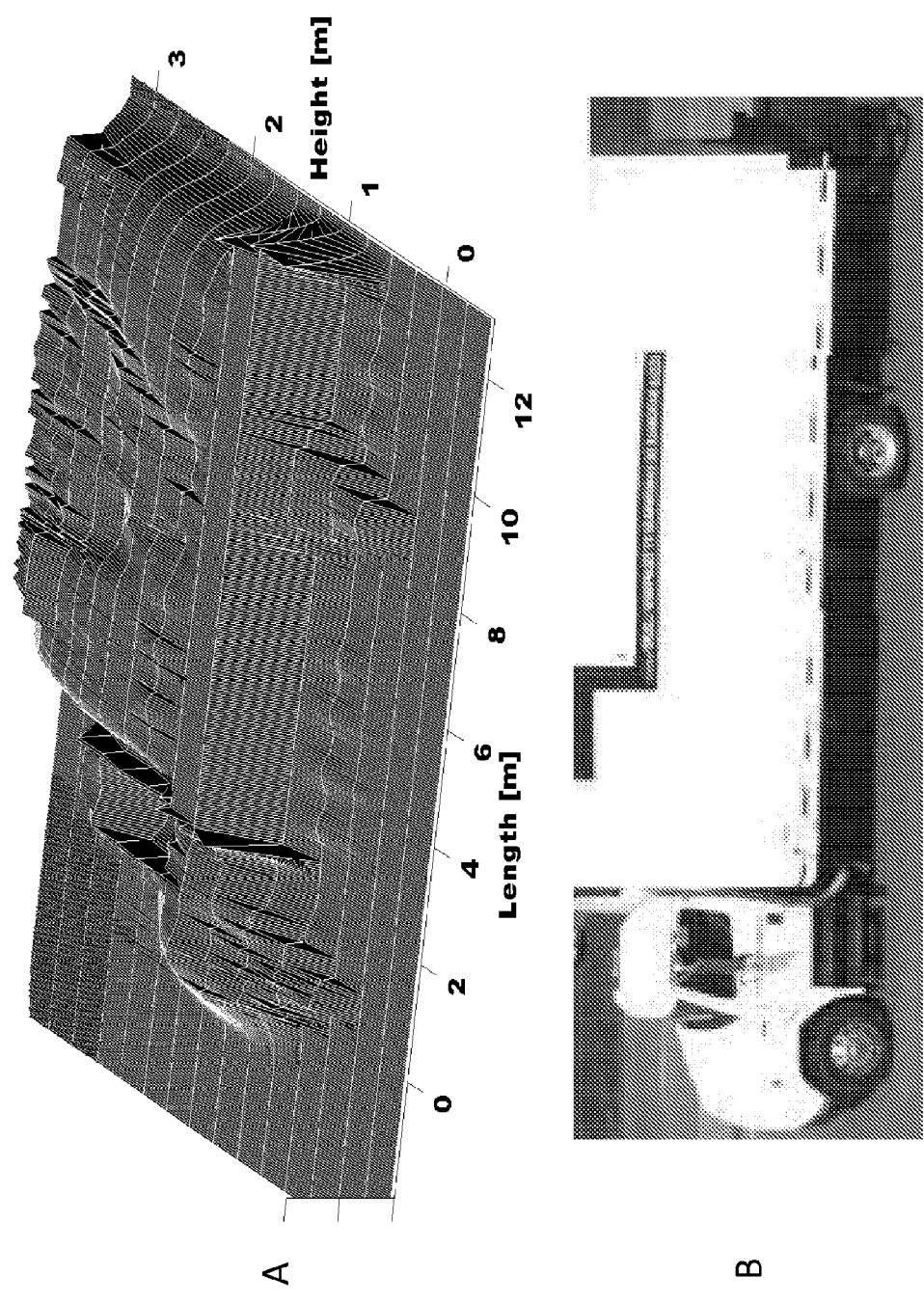

For example, when the sensor is used to scan the road as shown in FIG. 1, the vehicles are examined laterally. FIGS. 20A and 20B show the results of an automated vehicle classification system based on the vehicle height and the number of axles. In FIGS. 20A and 20B, the vehicle height is determined using the highest detected reflection. It is also apparent that nothing is touching the ground since there are no detected reflections between the lower ground reflections and the strong vehicle reflections. Because the system detects vehicles, one can assume that what is touching the ground is a wheel of the vehicle and this therefore indicates an axle of the vehicle.

Figure 21:
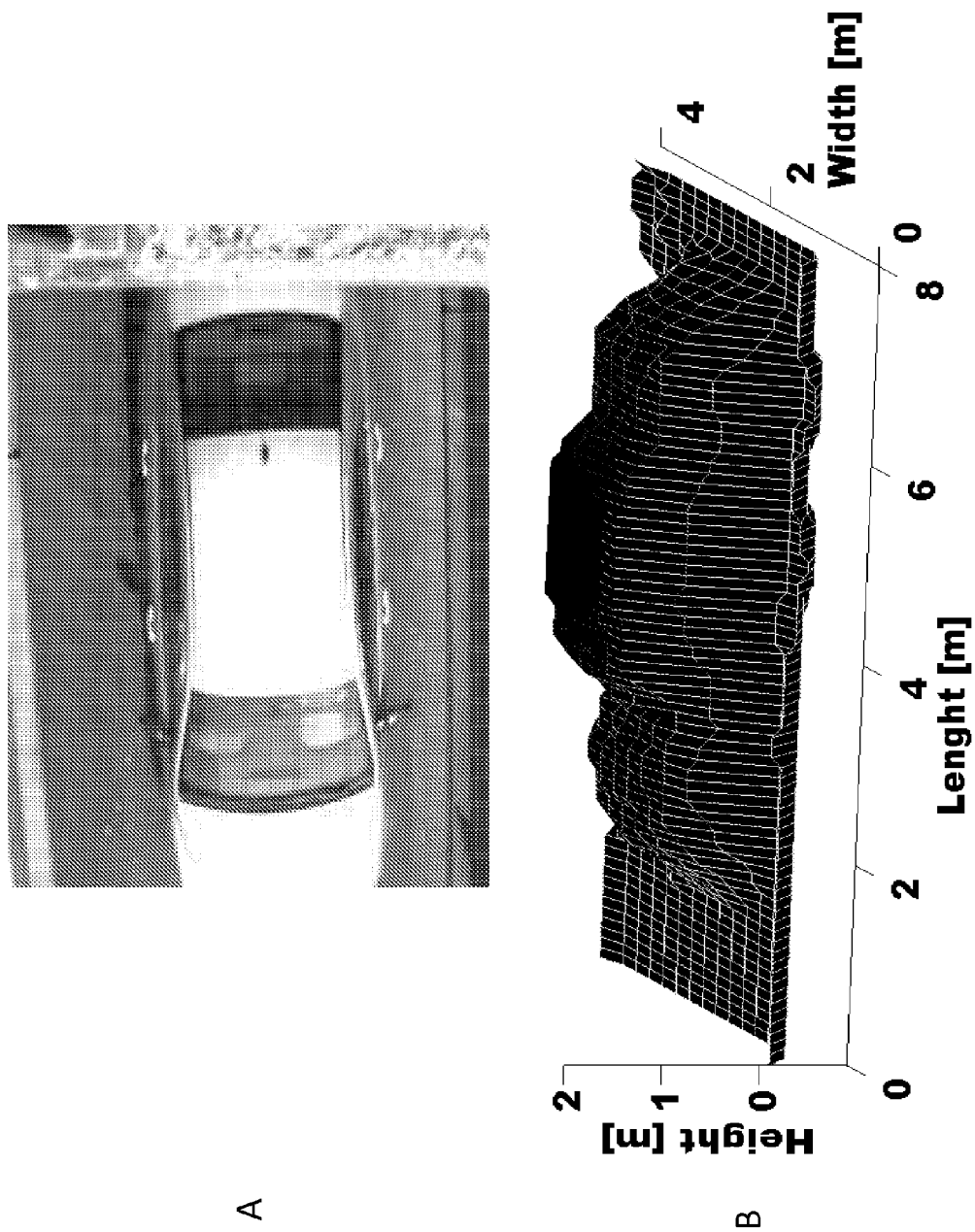

The system can also classify vehicles based on their profile when the traffic detection system is installed under a transversal beam of a gantry above the road. As shown in FIGS. 21A and 21B, the shape of the vehicle is reconstructed from the data set which includes the entire duration of the detection by the traffic detection system. This method provides an effective solution for modeling the complete volume of an object in order to distinguish between vehicle types.

8—Reaction Time and Transmission of Information

For some applications, the system has to detect and send information rapidly. The best way to synchronize the sensor with an external system when a detection event occurs is by using a hardware trigger. It could be useful to take a snapshot with an external camera for example. The hardware trigger could include relay units, solid state relay units, differential lines, etc. Additional information related to this hardware trigger can be sent by the interface. A hardware trigger can therefore trigger an external camera to take a snapshot. Additional information is sent to a computer with some details of the event like the position of the detected object. In some cases, information sent by the sensor can be used to recall or cancel a hardware trigger. This can happen when the detection system needs to react very rapidly but, afterwards, the analysis module detects that it was a false alarm.

The invention claimed is:

1. A method for detecting a vehicle located in a detection zone of a roadway having at least one lane, said detection zone on said roadway at least partly covering a width of said lane, the method comprising:
  providing an optical detection multi-channel scannerless full-waveform lidar system operating in pulsed Time-Of-Flight operation, an optical window of said full-waveform lidar system being oriented towards a surface of said roadway in order for said full-waveform lidar system to cover said detection zone;
  providing at least one initialization parameter for said full-waveform lidar system; using said full-waveform lidar system,
    emitting pulses at an emission frequency;
    receiving reflections of said pulses from said detection zone; and
    acquiring and digitalizing a series of individual complete traces at each optical detection channel of said multi-channel system;
  identifying at least one detection in at least one of said individual complete traces; obtaining a height of said detection and an intensity for said detection using said individual complete trace;

determining a nature of said detection to be one of an environmental particle detection, a candidate object detection and a roadway surface detection using at least one of said individual complete traces, said height of said detection, said intensity and said at least one initialization parameter;

if said nature of said detection is said candidate object detection, detecting a presence of a vehicle in said detection zone;

the method further comprising obtaining a distance of said detection from said full-waveform lidar system using said individual complete trace and said initialization parameter, wherein said determining said nature includes using at least one of said individual complete traces, said height of said detection, said intensity, said distance of said detection from said full-waveform lidar system, and said at least one initialization parameter;

wherein said determining said nature includes:

determining a probability that said nature of said detection is said environment particle if said tracking said evolution determines that said height decreases by more than a height threshold and said distance increases by more than a distance threshold;

if said probability is higher than a probability threshold, determining said nature to be said environmental particle.

2. The method as claimed in claim 1, further comprising tracking an evolution of said detection in a time-spaced individual complete trace, said time-spaced individual complete trace being acquired after said individual complete trace, wherein said determining said nature includes comparing at least one of said height and said intensity in said time-spaced individual complete trace and said individual complete trace.

3. The method as claimed in claim 1, wherein said determining said nature to be said environmental particle includes determining a presence of at least one of fog, water, rain, liquid, dust, dirt, vapor, snow, smoke, gas, smog, pollution, black ice and hail.

4. The method as claimed in claim 1, further comprising identifying a presence of a retroreflector on said vehicle using said individual complete traces and said initialization parameters, by comparing an intensity of said detections with an intensity threshold and identifying detections having an intensity higher than said intensity threshold to be caused by a retroreflector on said vehicle.

5. The method as claimed in claim 4, further comprising tracking an evolution of said detection in a time-spaced individual complete trace, said time-spaced individual complete trace being acquired at a time delay after said individual complete trace, wherein said identifying said presence of said retroreflector is carried out for said individual complete trace and said time-spaced individual complete trace, determining a distance of said retroreflector using said individual complete trace and said time-spaced individual complete trace and estimating a speed of said vehicle based on said initialization parameter, said distance and said time delay.

6. The method as claimed in claim 1, wherein said optical detection multi-channel scannerless full-waveform lidar system includes a light emitting diode (LED) light source adapted to emit said pulses.

7. The method as claimed in claim 1, wherein said digitalizing said series of individual complete traces at each optical detection channel of said optical detection multi-channel system includes digitalizing said series at a high frame rate, said high frame rate being greater than 100 Hz.

8. The method as claimed in claim 1, further comprising providing an image sensing module adapted and positioned to acquire an image covering at least said detection zone;

synchronizing acquisition of said image with said acquiring and digitalizing of said full-waveform lidar system;

acquiring said image with said image sensing module.

9. The method as claimed in claim 8, further comprising recognizing a pattern in said image using said initialization parameter.

10. The method as claimed in claim 9, wherein said pattern is a circle, said pattern in said image corresponding to a wheel of said vehicle.

11. The method as claimed in claim 9, further comprising determining a position of said pattern in said image, taking a second image after an elapsed time delay, recognizing said pattern in said second image and determining a second position of said pattern, determining a displacement of said pattern between said image and said second image.

12. The method as claimed in claim 11, further comprising obtaining a distance for said pattern using said individual complete traces and said initialization parameter, and estimating a speed of said vehicle using said displacement, said distance for said pattern in said image and said pattern in said second image, said elapsed time delay and said initialization parameter.

13. The method as claimed in claim 1, wherein a longitudinal dimension of said detection zone is perpendicular to said roadway.

14. The method as claimed in claim 1, further comprising identifying a section of said vehicle detected to be present in said detection zone using said individual complete trace, said section being one of a front, a side, a top and a rear of said vehicle, said identifying said section including comparing a height of said detection with a height threshold and comparing an intensity of said detection with an intensity threshold.

15. The method as claimed in claim 14, further comprising determining a position of said section of said vehicle in said detection zone using at least one of said individual complete traces and said at least one initialization parameter.

16. The method as claimed in claim 1, further comprising determining a current lane of said roadway in which said vehicle is present using said initialization parameter and said individual complete trace.

17. The method as claimed in claim 1, wherein said obtaining said height and said intensity for said detection using said individual complete trace further comprises converting said detections in Cartesian coordinates.

18. The method as claimed in claim 1, further comprising generating a profile of one of a side and a top of said vehicle using a plurality of said individual complete traces.

19. The method as claimed in claim 5, further comprising determining a length of said vehicle using a plurality of said individual complete traces and said speed of said vehicle, said time delay and said initialization parameter.

20. The method as claimed in claim 1, further comprising providing a second one of said optical detection multi-channel scannerless full-waveform lidar system, an optical window of said second optical detection multi-channel scannerless full-waveform lidar system being oriented towards a surface of said roadway in order for said second system to cover a second detection zone, said second detection zone at least partly overlapping said detection zone, operation of said full-waveform lidar system and said second full-waveform lidar system being synchronized.

21. The method as claimed in claim 1, further comprising providing a second one of said optical detection multi-channel scannerless full-waveform lidar system, an optical window of said second optical detection multi-channel scannerless full-waveform lidar system being oriented towards a surface of said roadway in order for said second system to cover a second detection zone, operation of said full-waveform lidar system and said second full-waveform lidar system being synchronized, wherein said second system is provided at a lateral offset on said roadway with respect to said full-waveform lidar system; determining a speed of the vehicle using a delay between detection of said vehicle by said full-waveform lidar system and said second full-waveform lidar system and said initialization parameter.

22. The method as claimed in claim 1, further comprising associating a type to said vehicle to classify said vehicle using said height.

23. The method as claimed in claim 19, further comprising associating a type to said vehicle to classify said vehicle using at least one of said height and said length.

24. The method as claimed in claim 10, further comprising associating a type to said vehicle to classify said vehicle using at least one of said height, said length and said pattern.

25. The method as claimed in claim 18, further comprising associating a type to said vehicle to classify said vehicle using at least one of said height, said length, said pattern and said profile.

26. The method as claimed in claim 1, further comprising generating a detection signal upon said detecting said presence.

27. The method as claimed in claim 26, wherein said detection signal controls at least one of a hardware trigger and a software trigger.

28. The method as claimed in claim 26, wherein said detection signal includes information about said detection.

29. The method as claimed in claim 27, further comprising generating a recall signal to invalidate at least one of said hardware trigger and said software trigger.

30. The method as claimed in claim 1, further comprising storing information about said detection.

31. The method as claimed in claim 30, further comprising generating and storing statistical information.

32. The method as claimed in claim 11, further comprising determining a direction of displacement of said vehicle using said displacement and identifying a wrong-way vehicle using said direction of displacement and said initialization parameter.

* * * * *